United States Patent
Yanagawa et al.

(10) Patent No.: US 7,623,435 B2
(45) Date of Patent: Nov. 24, 2009

(54) OPTICAL PICKUP DEVICE, AND INFORMATION RECORDING AND REPRODUCTION DEVICE

(75) Inventors: Naoharu Yanagawa, Tokorozawa (JP); Fumihiko Sano, Tokorozawa (JP)

(73) Assignee: Pioneer Corporation, Meguro-ku, Tokyo (JP)

( * ) Notice: Subject to any disclaimer, the term of this patent is extended or adjusted under 35 U.S.C. 154(b) by 229 days.

(21) Appl. No.: 11/660,540

(22) PCT Filed: Aug. 12, 2005

(86) PCT No.: PCT/JP2005/014832

§ 371 (c)(1),
(2), (4) Date: Jun. 8, 2007

(87) PCT Pub. No.: WO2006/019052

PCT Pub. Date: Feb. 23, 2006

(65) Prior Publication Data

US 2007/0247997 A1    Oct. 25, 2007

(30) Foreign Application Priority Data

Aug. 20, 2004 (JP) .............................. 2004-241639

(51) Int. Cl.
G11B 7/00 (2006.01)
(52) U.S. Cl. ............................... 369/112.24; 369/44.37
(58) Field of Classification Search ........................ None
See application file for complete search history.

(56) References Cited

U.S. PATENT DOCUMENTS 5,208,801 A * 5/1993 Finegan ....................... 369/284
7,075,879 B2 * 7/2006 Kim ....................... 369/112.03

FOREIGN PATENT DOCUMENTS

| JP | 61-199247 | 9/1986 |
| JP | 63-100622 | 5/1988 |
| JP | 63-244335 | 10/1988 |
| JP | 64-017228 | 1/1989 |
| JP | 02-054434 | 2/1990 |
| JP | 10-233026 | 9/1998 |
| JP | 10-293941 | 11/1998 |
| JP | 2000-076688 | 3/2000 |
| JP | 2000-173084 | 6/2000 |
| JP | 2002-288847 | 10/2002 |

* cited by examiner

Primary Examiner—Paul Huber
(74) Attorney, Agent, or Firm—Drinker Biddle & Reath LLP

(57) ABSTRACT

A sufficient S/N ratio in reproduction of an optical disk is achieved without complexing a circuit structure even if a data recording speed relative to the optical disk is increased. When data is recorded into an optical disk (DK), in an information recording and reproduction device (RP), both a first light beam and a second light beam are emitted at the same time. A sub-actuator section (20) is provided in addition to a main actuator (15) for correcting the displacement of light collecting spots caused by the displacement between the optical axis of the first beam and the optical axis of the second beam. Only the optical axis of the second light beam is adjusted by the sub-actuator section (20).

14 Claims, 14 Drawing Sheets

OPTICAL PICKUP DEVICE, AND INFORMATION RECORDING AND REPRODUCTION DEVICE

This application is a 371 of PCT/JP05/14832, filed Aug. 12, 2005.

TECHNICAL FIELD

The present invention relates to an optical pickup apparatus used for recording and reproducing information to an information recording medium such as an optical disk and an information recording and reproduction apparatus using the optical pickup apparatus.

BACKGROUND ART

Conventionally, various information recording and reproduction apparatus (hereinafter, simply referred to as an "information recording and reproduction apparatus") such as a compatible player, which records and reproduce data on/from various optical disks such as a DVD (Digital Versatile Disk) and a CD (Compact Disk) having different standards, are provided. In the information recording and reproduction apparatus of this type, an increase in recording speed of data on an optical disks such as a DVD-R is desired to be increased in order to improve the convenience for a user and discriminate the apparatus from another product.

However, in an optical disk such as a DVD-R or a DVD-RW, a pigmentary change or a phase change occurs when a total amount of energy of an optical beam irradiated per predetermined unit time exceeds a predetermined threshold value, thereby recording various data. For this reason, when a relative speed of the optical disk to an optical beam the recording speed of which is increased, data recording cannot be realized without increasing the amount of energy of the irradiated optical beam.

On the other hand, as a light source used in the information recording and reproduction apparatus of this type, a light source in which an amount of heat radiation increases with an increase in outputtable wattage, i.e., at present, in terms of countermeasure against heat radiation, no more than 150 mW (milliwatt) is realized. For this reason, a theoretical maximum recording speed depends on the performance of the light source, and a recording speed cannot be desired to be further increased unless a new light source is developed.

Conventionally, the following proposal is made. That is, for example, two light sources corresponding to optical beams having wavelengths of 780 nm and 650 nm are simultaneously turned on in recording data on a CD-R, and a tracking error signal and a focus error signal are acquired by using the optical beam having the wavelength of 780 nm, so that the using efficiency of the optical beam having the wavelength of 650 nm used in data recording (see Patent Document 1).

Patent Document 1: Japanese Patent Application Laid-Open (JP-A) No. 2000-173084

DISCLOSURE OF THE INVENTION

Problem to be Solved by the Invention

However, when tracking and focusing are to be actually corrected, as in the invention described in JP-A No. 2000-173084, tracking or the like of an optical beam having a small wavelength is difficult to be corrected with high accuracy by using an optical beam having a large wavelength.

In recording of data on an optical disk, irradiation regions (hereinafter, referred to as "focusing spots") of both the optical beams having the wavelengths on the optical disk must be made coincide with each other. However, in the apparatus described in JP-A No. 2000-173084, displacement of optical axes between the two optical beams occurs. When displacement between the focusing spots of both the optical beams occurs, the displacement cannot be corrected.

The present application is made in consideration of the above circumstances, as an example of the problem, has as its object to provide an optical pickup apparatus and an information recording and reproduction apparatus in which even though a configuration for simultaneously irradiating a plurality of optical beams on an optical disk is employed, error correction for tracking or the like can be performed at high accuracy while reliably making focusing spots of the optical beams coincide with each other.

Means for Solving the Problems

To Solve the above-mentioned problems, according to a first aspect of the present invention, there is provided an optical pickup apparatus which has a first light source and a second light source which simultaneously irradiate a first optical beam and a second optical beam on an information recording medium and receives reflected beams of the first optical beam and the second optical beam from the information recording medium, the optical pickup apparatus comprising: an objective lens for focusing the first optical beam and the second optical beam on the information recording medium; an irradiation position changing device having a sub-lens for changing a focus irradiation position of the second optical beam on the information recording medium; a splitter device for splitting the reflected beams into a first reflected beam serving as the reflected beam of the first optical beam and a second reflected beam serving as the reflected beam of the second optical beam respectively; a light-receiving device for receiving the first reflected beam to output a first light-receiving signal and which receives the second reflected beam to output a second light-receiving signal; and a control device for controlling the irradiation position changing device on the basis of the second light-receiving signal.

According to another sixteenth aspect of the present invention, there is provided an information recording and reproduction apparatus including an optical pickup apparatus which has a first light source and a second light source which simultaneously irradiate a first optical beam and a second optical beam on an information recording medium and receives reflected beams of the first optical beam and the second optical beam from the information recording medium, the optical pickup apparatus comprises: an objective lens for focusing the first optical beam and the second optical beam on the information recording medium; an irradiation position changing device for changing a focus irradiation position of the second optical beam on the information recording medium; a splitter device for each splitting the reflected beams into a first reflected beam serving as the reflected beam of the first optical beam and a second reflected beam serving as the reflected beam of the second optical beam; a light-receiving device for receiving the first reflected beam to output a first light-receiving signal and which receives the second reflected beam to output a second light-receiving signal; and a control device for controlling the irradiation position changing device on the basis of the second light-receiving signal.

REFERENCE NUMERALS

DK Optical disk
RP, RP2, RP3, RP4 Information recording and reproduction apparatus
SP Signal processing section
C Control section
D Drive circuit
PU Optical pickup
MS Main servo circuit
SS Sub-servo circuit
P Reproduction section
LD LPP detection circuit
PD Phase detector circuit
ZS Z-axis servo circuit
VFC Drive voltage
SPC Control pulse
ISPC Inverse control pulse

BEST MODE FOR CARRYING OUT THE INVENTION

[1] First Embodiment

Figure 1:
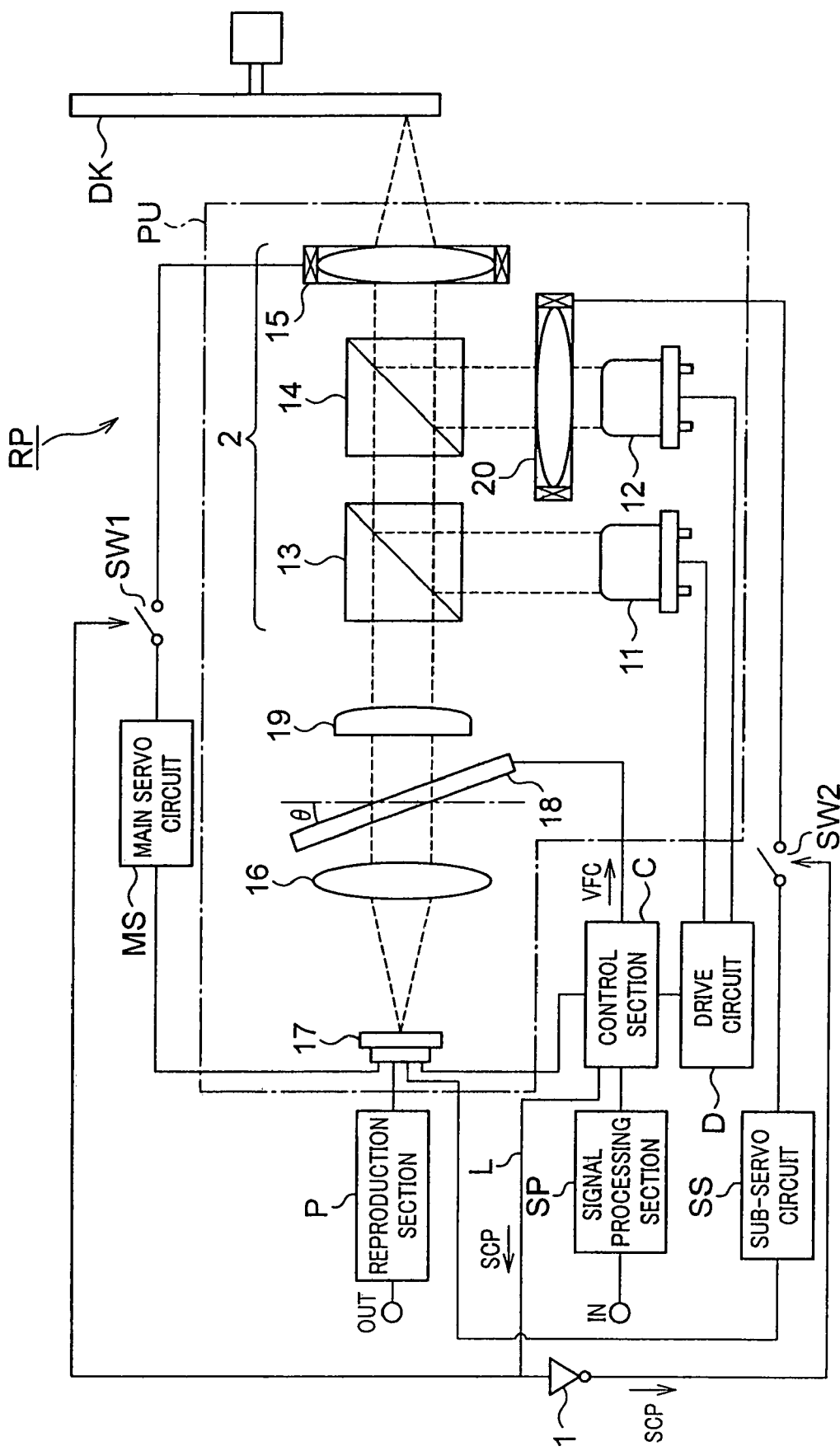
FIG. 1 is a block diagram showing a configuration of an information recording and reproduction apparatus RP according to a first embodiment.

[1.1] Configuration of the First Embodiment
(1) Outline of Information Recording and Reproduction Apparatus According to First Embodiment An outline of an information recording and reproduction apparatus RP according to the embodiment will be described below with reference to FIG. 1 showing a configuration of the information recording and reproduction apparatus RP according to the embodiment. The information recording and reproduction apparatus RP is obtained by applying the present invention to a compatible player for recording and reproducing data on/from a optical disk DK conforming to both the standards of a CD and a DVD.

As shown in FIG. 1, the information recording and reproduction apparatus RP according to the embodiment includes a signal processing section SP, a control section C, a drive circuit D, an optical pickup PU, a reproduction section P, a main servo circuit MS, and a sub-servo circuit SS. The information recording and reproduction apparatus RP irradiates an optical beam on the optical disk DK and receives a reflected beam from the optical disk DK to record and reproduce data on/from the optical disk DK conforming to the standards of a CD and a DVD. "Control device" and "lens control device" in "scope of claims" correspond to, for example, the control section C, the main servo circuit MS, and the sub-servo circuit SS.

On the optical pickup PU according to the embodiment to realize these function, a first light source 11 which outputs an optical beam (hereinafter, referred to as a "first optical beam") having a wavelength of 660 nm conforming to the DVD standard and a second light source 12 which outputs an optical beam (hereinafter, referred to as a "second optical beam") having a wavelength of 780 nm conforming to the CD standard are arranged (when the optical beams need not be specifically distinguished from each other, the optical beams are simply referred to as "optical beams".

The information recording and reproduction apparatus RP employs a configuration in which, in recording of data on the optical disk DK, both the first light source 11 and the second light source 12 are controlled, and both the first and second beams are simultaneously irradiated on a recording surface of the optical disk DK (hereinafter, simply referred to as "on the optical disk") to increase amounts of energy of the optical beams irradiated on the optical disk DK, so that a recording speed of data on the optical disk DK is increased. It is arbitrarily determined whether both the optical beams are irradiated in data recording on the optical disk DK conforming to the CD standard. However, in order to make the description more specific, the following description will be made on the assumption that both the optical beams are irradiated only in recording of data on the optical disk DK conforming to the DVD standard.

Figure 2:
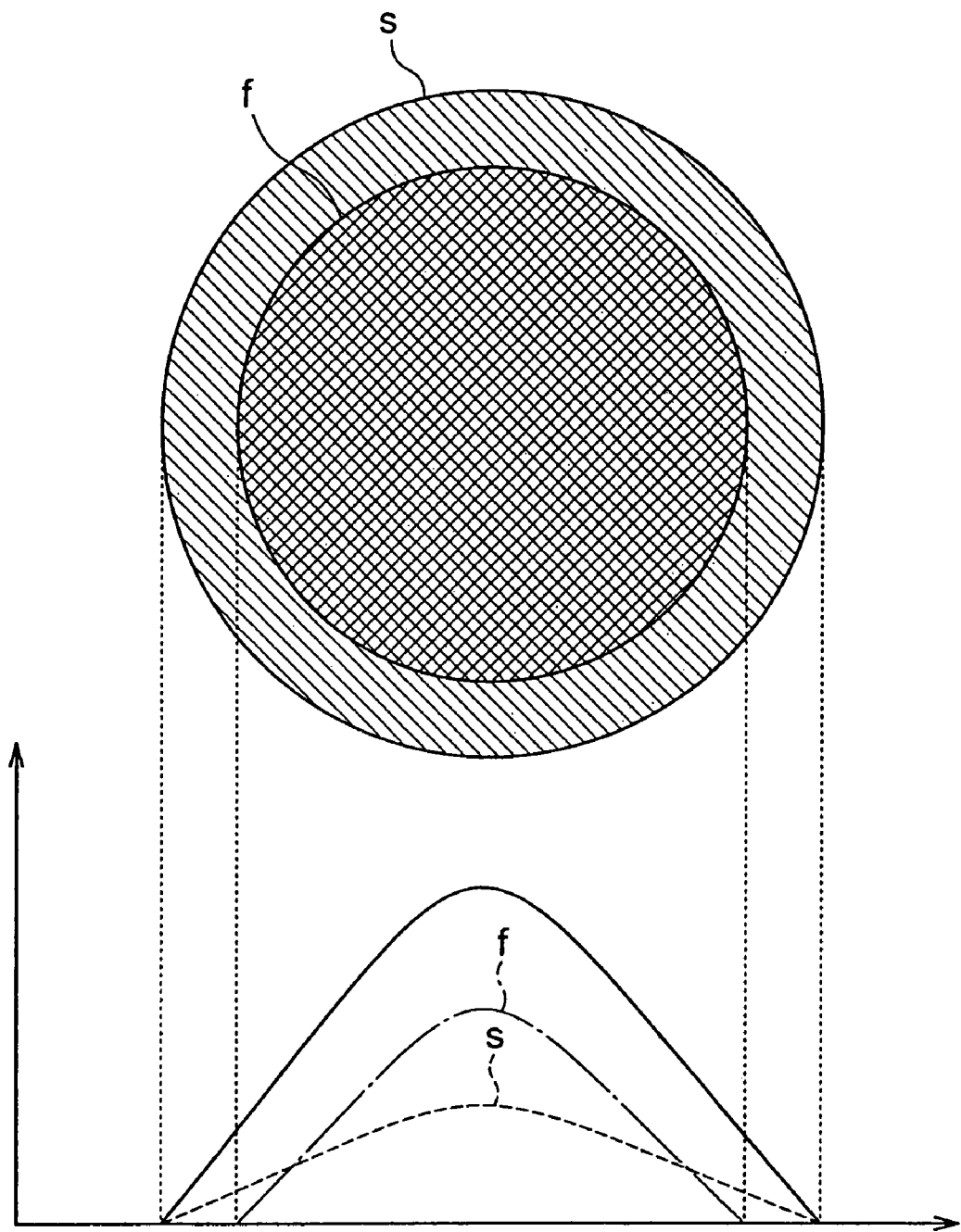
FIG. 2 is a schematic diagram showing a focusing spot on an optical disk DK according to the embodiment and an energy distribution on the focusing spot.

When the method is employed, a relationship between a focusing spot on the optical disk DK and an energy distribution of an optical beam within the focusing spot is shown in FIG. 2. In FIG. 2, respective positions on focusing spots f and s are correlated with the abscissa on the graph.

As shown in FIG. 2, in the embodiment, when the first and second beams are simultaneously irradiated, the focusing spot f of the first optical beam (DVD) appears in the focusing spot s of the second optical beam (CD). With respect to both the focusing spots f and s, since the energy distributions depend on a Gaussian distribution, when both the spots f and s are completely coincide with each other at a central point, a sum of energy amounts at the respect points is an amount of energy of the optical beams on the optical disk DK according to the superposition principle of light. According to this configuration, it is understood that the amount of energy of the optical beam irradiated on the optical disk DK can be increased.

However, when the configuration is employed, if the centers of the focusing spot f and the focusing spot s cannot be made coincide with each other, a desired amount of energy cannot be obtained. For example, in the case shown in FIG. 2, when the focusing spot f runs out of the focusing spot s, superposition of light does not occur with respect to the run-out portion. For this reason, an amount of energy on the optical disk DK is difficult to be assured. Therefore, when the method is employed, both the spots f and s must be made coincide with each other on the optical disk DK.

Therefore, in the optical pickup PU according to the embodiment, in addition to a main actuator section 15 including an objective lens which focusing an optical beam on the optical disk DK and a drive mechanism which changes the position of the objective lens, a sub-actuator section 20 including a sub-lens immediately before the second light source 12, so that both the focusing spots f and s are made coincide with each other by using both the actuator sections 15 and 20.

For example, in the example shown in FIG. 2, displacement of the optical axis of the second optical beam occurs with reference to the first optical beam (for DVD). A case in which the focusing spots f and s are not coincide with each other (i.e., when displacement between the focusing spots f and s occurs) will be considered. In this state, even though correction is performed only by the main actuator section 15, the displacement of optical axes which has already occurred is corrected to make it impossible to make the focusing spots f and s coincide with each other. Therefore, the information recording and reproduction apparatus RP according to the embodiment employs a configuration in which only the optical axis of the second optical beam is made variable by using the sub-actuator section 20 to change the position of the focusing spot s, thereby correcting the displacement of the focusing spot s with respect to the focusing spot f. In this case, a tracking error and a focus error generated with respect to the first optical beam are consequently corrected by the main actuator section 15.

In this case, a problem is a direction in which the displacement of optical axes. In general, when displacement of the optical axes occurs, the displacement occurs with respect to not only a radial direction (hereinafter, referred to as a "tracking direction") and a focus direction, but also a circumference direction (hereinafter, referred to as a "jitter direction") of the optical disk DK. Therefore, even though a conventional biaxial actuator is used as the sub-actuator section 20, accurate optical axial adjustment cannot be performed. For this reason, in the information recording and reproduction apparatus RP according to the embodiment, a triaxial actuator, which can move sub-lenses in triaxial directions, is employed as the sub-actuator section 20. A specific configuration of the sub-actuator section 20 will be described below.

On the other hand, even though the main actuator section 15 and the sub-actuator section 20 are driven in the same direction, the displacement of the optical axes cannot be canceled. Therefore, in order to correct the displacement of the optical axes occurring between both the optical beams, the main actuator section 15 and the sub-actuator section 20 must be independently controlled. In the embodiment, the following method is employed.

A wavelength filter 18 which electrically changing transmission wavelengths is arranged on an optical path of reflected beams (hereinafter, referred to as a "first reflected beam" and a "second reflected beam") of the first and second optical beams on the optical disk DK (unless otherwise specified, hereinafter, simply referred to as a "reflected beam"). More specifically, when the transmission wavelengths of the wavelength filter 18 are changed at predetermined time intervals, and the reflected beam received by the photodetector 17 is time-divisionally switched. In other words, the transmission wavelength of the wavelength filter 18 is time-divisionally switched between 660 nm and 780 nm. As a result, the first reflected beam and the second reflected beam are time-divisionally received by a photodetector 17.

The information recording and reproduction apparatus RP according to the embodiment employs a configuration, in which, on the basis of a detection signal corresponding to a receiving state of the first reflected beam of the reflected beams time-divisionally received as described above, the main actuator section 15 is driven, and the sub-actuator section 20 is driven on the basis of a detection signal corresponding to the receiving state of the second reflected beam.

More specifically, the following method is used. A detection signal depending on a light-receiving state in the photodetector 17 is supplied from the photodetector 17 to both the main servo circuit MS and the sub-servo circuit SS, and correction signals such as tracking error signals are generated on the basis of the detection signal in both the main servo circuits MS and SS. At this time, a time zone in which the first reflected beam is received and a time zone in which the second reflected beam is received are not discriminated from each other in the photodetector 17, and the detection signal is fed back from the photodetector 17 to both the servo circuits MS and SS. For this reason, a correction signal is generated according to the detection signal. Even though the actuator sections 15 and 20 are driven without any change, a desired correction result cannot be obtained.

For this reason, in the embodiment, switches SW1 and SW2 are arranged on signal lines extending from both the servo circuits MS and SS to both the actuator sections 15 and 20, and on/off states of the switches SW1 and SW2 are switched depending on a change timing of the transmission wavelengths in the wavelength filter 18.

As a result, in the information recording and reproduction apparatus RP according to the embodiment, when the first reflected beam is received by the photodetector 17, the switch SW1 is kept in an "on" state, the switch SW2 is kept in an "off" state, and the main actuator section 15 is controlled depending on a light-receiving state of the first reflected beam. On the other hand, in the state in which the second reflected beam is received by the photodetector 17, the switch SW2 is kept in an "on" state, the switch SW1 is kept in an "off" state, and the sub-actuator section 20 is controlled depending on the light-receiving state of the second reflected beam.

(2) Specific Configuration and Operation of Information Recording and Reproduction Apparatus RP A specific configuration of the information recording and reproduction apparatus RP described above will be sequentially described below with reference to FIG. 1 described above.

The signal processing section SP has an input terminal, and signal processing is performed to data externally input through the terminal to output the data to the control section C. Specific processing contents performed in the signal processing section SP are arbitrarily set. For example, after the input data is compressed by a compressing scheme such as MPEG (Moving Picture Experts Group), the data may be output to the control section C.

The control section C is mainly constituted by a CPU (Central Processing Unit), and respective sections of the information recording and reproduction apparatus RP are controlled. For example, when data is recorded on the optical disk DK, the control section C outputs a signal corresponding to the data input from the signal processing section SP to the drive circuit D. When the data recorded on the optical disk DK is reproduced, the control section C outputs a predetermined signal to the drive circuit D regardless of the presence/absence of the data input from the signal processing section SP.

Furthermore, in order to realize the time-divisional light receiving, the control section C supplies a drive voltage VFC to the wavelength filter 18 and changes a transmittable wavelength of the wavelength filter 18. At this time, the control section C supplies a control pulse SCP to a line L connected to the switches SW1 and SW2 to turn on/off the switches SW1 and SW2. A specific method of outputting the drive voltage VFC and the control pulse SCP by the control section C will be described in detail in a paragraph for the operation.

The drive circuit D is mainly constituted by an amplifying circuit. The drive circuit D amplifies a signal input from the control section C and then supplies the amplified signal to the optical pickup PU. An amplification factor in the drive circuit D is controlled by the control section C. When data is recorded on the optical disk DK, the amplification factor is controlled such that an optical beam having an amount of energy (hereinafter, referred to as a "recording power") which can cause a phase change or a pigmentary change on the optical disk DK is output from the optical pickup PU. On the other hand, when data recorded on the optical disk DK is reproduced, the amplification factor is controlled such that an optical beam having an amount of energy (hereinafter, referred to as a "reproducing power") which does not cause a phase change or the like on the optical disk DK is output from the optical pickup PU.

The main servo circuit MS and the sub-servo circuit SS generate correction signals such as tracking error signals on the basis of the detection signal output from the photodetector 17. Of the main servo circuit MS and the sub-servo circuit SS, depending on the generated correction signals, respectively, the main servo circuit MS supplies a drive signal to the main actuator section 15 through the switch SW1, and the sub-servo circuit SS supplies a drive voltage to the sub-actuator section 20 through the switch SW2.

The reproduction section P has an output terminal, amplifies an RF signal supplied from the photodetector 17, and outputs the RF signal through the output terminal.

The optical pickup PU is used to irradiate an optical beam on the optical disk DK on the basis of the signal supplied from the drive circuit D and to record and reproduce data on/from the optical disk DK. In order to realize the function, in the embodiment, the optical pickup PU has, for example, the first light source 11, the second light source 12, an optical section 2, a focusing lens 16, the photodetector 17, the wavelength filter 18, and a cylindrical lens 19.

An "objective lens" and a "lens moving device" in "Scope of Claims" correspond to, for example, the main actuator section 15, an "irradiation position changing device" corresponds to, for example, the sub-actuator section 20, a "split device" corresponds to, for example, the wavelength filter 18 and the control section C, and a "light-receiving device" corresponds to, for example, the photodetector 17.

The first light source 11 and the second light source 12 are constituted by laser diodes, respectively, and output a first optical beam or a second optical beam each on the basis of a signal supplied from the drive circuit D.

The optical section 2 has a function that focuses optical beams output from the first light source 11 and the second light source 12 on the drive circuit D. The optical section 2 is constituted by first and second beam splitters 13 and 14 constituted by dichroic mirrors, the main actuator section 15, and the sub-actuator section 20. When the first and second beam splitters 13 and 14 are constituted by the dichroic mirrors, respectively, a dichroic mirror which reflects 90% of an optical beam of 660 nm, transmits 10% of the optical beam of 660 nm, and transmits 100% of the optical beam of 780 nm is desirably employed as the first beam splitter 13, and a dichroic mirror which reflects 90% of the optical beam of 780 nm, transmits 10% of the optical beam of 780 nm, and transmits 100% of the optical beam of 660 nm is desirably employed as the second beam splitter 14.

The cylindrical lens 19 gives astigmatism to a reflected beam being incident through the objective lens of the main actuator section 15 and the first and second beam splitters 13 and 14. The focusing lens 16 focuses the reflected beam given with the astigmatism in the cylindrical lens 19 on the photodetector 17.

The photodetector 17 is constituted by a photodiode, receives the reflected beam irradiated from the focusing lens 16, outputs a detection signal depending on the light-receiving state to the main servo circuit MS and the sub-servo circuit SS, and outputs an RF signal corresponding to the light-receiving result of the reflected beam to the control section C.

It is arbitrary determined whether a ¼ wavelength plate is arranged on the optical paths of the first optical beam and the second optical beam.

In the information recording and reproduction apparatus RP having the above configuration, the first optical beam output from the first light source 11 is directly irradiated on the first beam splitter 13, reflected by the first beam splitter 13, and then focused on the optical disk DK through the objective lenses of the second beam splitter 14 and the main actuator section 15. On the other hand, the second optical beam output from the second light source 12 is reflected by the second beam splitter 14 through the lens arranged in the sub-actuator section 20 and then the focused on the optical disk DK through the objective lens of the main actuator section 15.

In this manner, when the first and second optical beams are focused on the optical disk DK, the optical beams are reflected on the recording surface of the optical disk DK, then sequentially pass the second beam splitter 14 and the first beam splitter 13 through the objective lens of the main actuator section 15 again, and incident to the wavelength filter 18. The reflected beam being incident to the wavelength filter 18 is time-divisionally split in the wavelength filter 18, and the wavelength of the transmitted optical beam is changed in a predetermined cycle.

(3) Configuration of Photodetector 17 and Both Servo Circuits MS and SS

Figure 3:
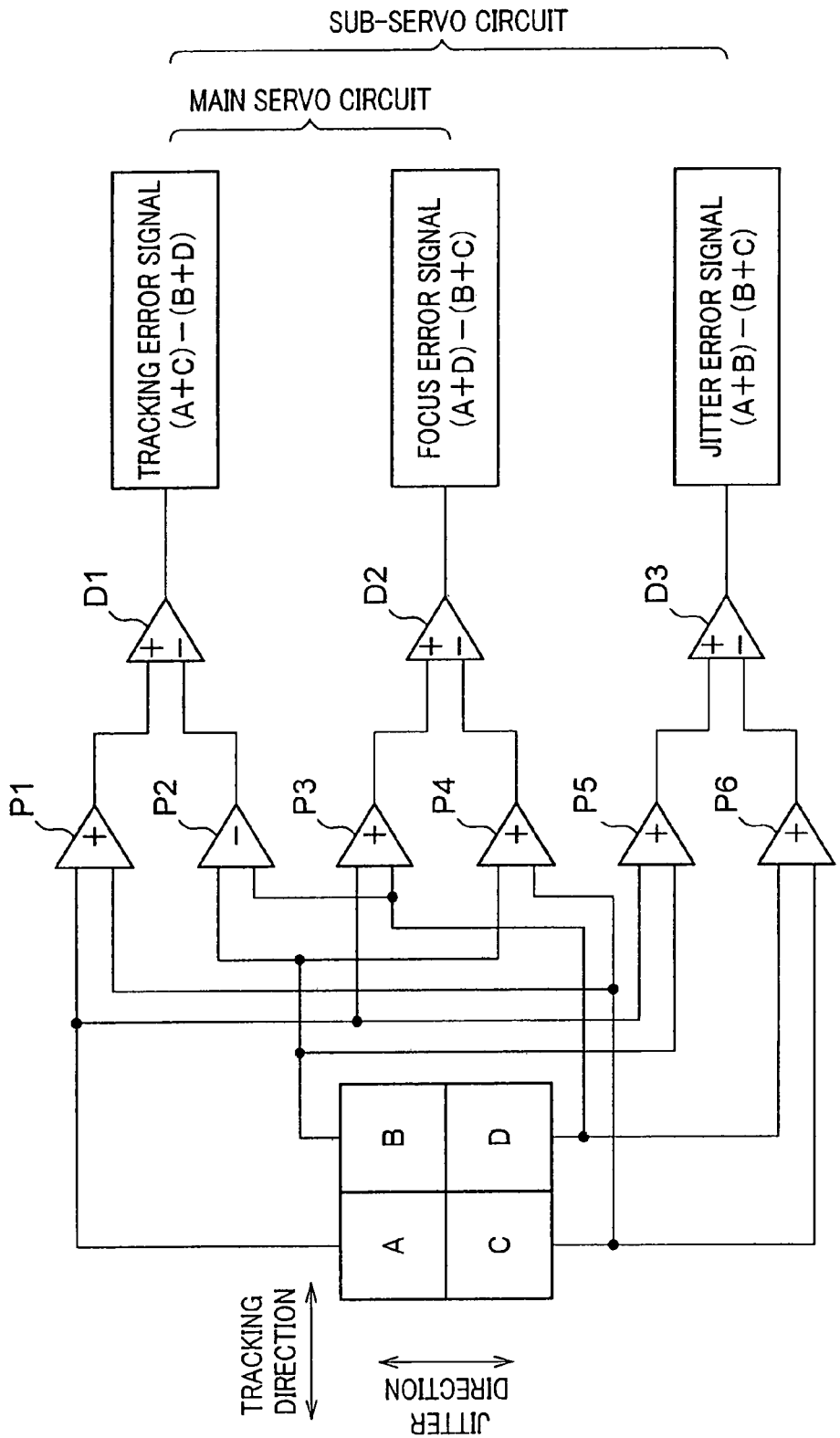
FIG. 3 is a diagram showing a configuration of a photodetector 17 and circuit configurations of a main servo circuit MS and a sub-servo circuit SS.

A specific configuration of the photodetector 17 according to the embodiment and a circuit configuration of the servo circuits MS and SS for acquiring correction signals on the basis of detection signal from the photodetector 17 will be described below with reference to FIG. 3. In FIG. 3, the horizontal directions on paper represent tracking directions of the optical disk DK, and the vertical directions on paper represent jitter directions.

In the information recording and reproduction apparatus RP according to the embodiment, the first reflected beam and the second reflected beam, as described above, sequentially, time-divisionally received by the photodetector 17. However, in order to make the centers of the focusing spots f and s of the first and second optical beams coincide with each other on the optical disk DK, the light-receiving positions of both the reflected beams in the photodetector 17 must be corrected to the central position of the photodetector 17.

Therefore, in the embodiment, the following method is employed.

As shown in FIG. 3, the photodetector 17 is divided by two in the horizontal directions (tracking directions) on paper and the vertical directions (jitter directions) each to set four regions A, B, C, and D. Detection signals in the regions A, B, C, and D are output to both the main servo circuit MS and the sub-servo circuit SS respectively.

On the other hand, the main servo circuit MS generates a tracking error signal and a focus error signal as correction signals on the basis of the detection signals supplied from the regions A to D. The sub-servo circuit SS generates these correction signals and a correction signal in the jitter directions (hereinafter, referred to as a "jitter error signal"). In order to realize the function, in the embodiment, adder circuits P1 to P4 and difference circuits D1 to D2 are arranged in the main servo circuit MS, and adder circuits P1 to P6 and difference circuits D1 to D3 are arranged in the sub-servo circuit SS.

Of these arithmetic operation circuits, the adder circuits P1 and P2 and the difference circuit D1 are arithmetic operation circuits which are arranged in both the main servo circuit MS and the sub-servo circuit SS. By the arithmetic operation circuits, tracking error signals are acquired. Of these arithmetic operation circuits, detection signals from the regions A and C are input to the adder circuit P1, and detection signals from the regions B and D are input to the adder circuit P2. Outputs from both the adder circuits P1 and P2 are input to the difference circuit D1. As a result, a signal expressed by an arithmetic expression given by Tr=(A+C)−(B+D) . . . (Expression 1) is output as a tracking error signal from the difference circuit D1.

The adder circuits P3 and P4 and the difference circuit D2 are arithmetic operation circuits arranged in both the main servo circuit MS and the sub-servo circuit SS. Focus error signals are acquired by the arithmetic operation circuits. More specifically, in the embodiment, an astigmatism is given to the reflected beam by the cylindrical lens 19, and focusing correction is performed by using an astigmatic method. For this reason, the detection signals from the regions A and D are input to the adder circuit P3, and the detection signals from the regions B and C are input to the adder circuit P4. As a result, a signal expressed by an arithmetic expression given by F=(A+D)−(B+C) . . . (Expression 3) is output as a focus error signal from the difference circuit D2.

On the other hand, the adder circuits P5 and P6 and the difference circuit D3 are arithmetic operation circuits arranged only in the sub-servo circuit SS. A jitter error signal is acquired by the arithmetic operation circuits. Of these arithmetic operation circuits, the detection signals from the regions A and B are input to the adder circuit P5, and the detection signals from the regions C and D are input to the adder circuit P6. As a whole, a jitter error signal given by J=(A+B)−(C+D) . . . (Expression 2) is obtained.

When the correction signals are obtained by the arithmetic operations, both the servo circuits supply a drive power to the main actuator section 15 or the sub-actuator section 20 according to the correction signals. In this case, both the main servo circuits MS and SS drive the actuator sections 15 to 20 such that the arithmetic operation results of the expressions 1 to 3 are equal to "0". As a result, the focusing spots f and s appearing on the recording surface of the optical disk DK are coincide with each other on the optical disk DK. As a specific correction method, an arbitrary correction method may be used. A table of amounts of correction and correction directions depending on correction signal values may be held so that the main actuator section 15 and the sub-actuator section 20 are driven on the basis of the table.

(4) Specific Structure of Actuator Section

A configuration of the sub-actuator section 20 according to the embodiment will be described below with reference to FIGS. 4 and 5.

<First Configuration>

Figure 4:
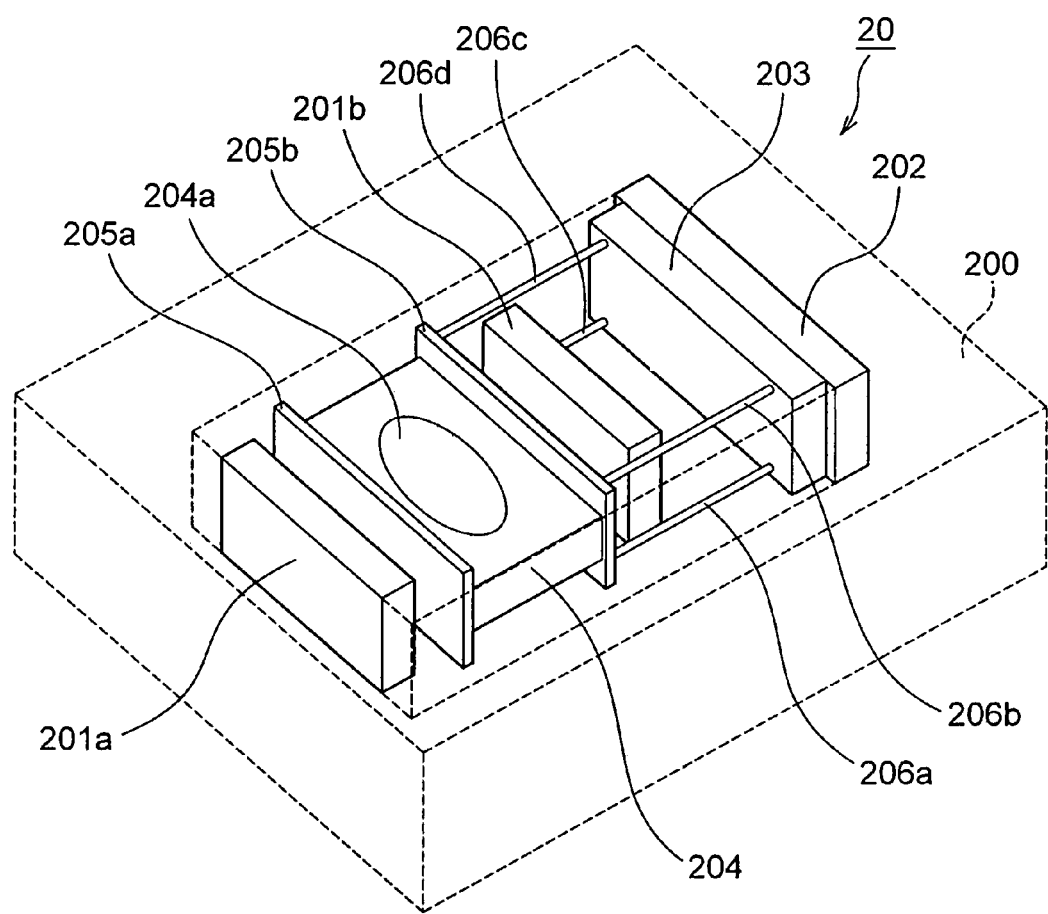
FIG. 4 is a diagram showing a first configuration of a sub-actuator section 20 according to the embodiment.

A first configuration of the sub-actuator section 20 is shown in FIG. 4. As shown in FIG. 4, the sub-actuator section 20 used in the embodiment has a configuration in which one pair of magnets 201a and 201b, a support member 202, a piezoelectric element 203, a lens holder 204 to which an objective lens 204a is fixed, one pair of print coils 205a and 205b, and four suspension wires 206a 206b, 206c, and 206d are arranged in an opening of a housing 200.

The support member 202 is an elastic member such as a spring fixed on a back surface of the piezoelectric element 203. The support member 202 is fixed to an end portion of the opening of the housing 200 on a surface opposing a surface on which the piezoelectric element 203 is fixed. In the support member 202, a circuit board (not shown) is arranged. The circuit board is connected to the sub-servo circuit SS and electrically connected to the piezoelectric element 203 and the suspension wires 206a 206b, 206c, and 206d.

The lens holder 204 is fixed to the piezoelectric element 203 through the suspension wires 206a 206b, 206c, and 206d and held such that the lens holder 204 can move in the tracking directions, the jitter directions, and the focusing directions with respect to the piezoelectric element 203.

The suspension wires 206a 206b, 206c, and 206d are rod-shaped members formed with a conductive material and electrically connect the circuit board of the support member 202 to the print coils 205a and 205b. The print coils 205a and 205b are fixed to both the side surfaces of the lens holder 204 and generate a magnetic field on the basis of drive powers supplied through the suspension wires 206a 206b, 206c, and 206d.

With the above configuration, when the drive power is supplied from the sub-servo circuit SS, the drive power is supplied to the print coils 205a and 205b through the suspension wires 206a 206b, 206c, and 206d in the tracking directions and the focusing directions. The position of the lens holder 204 is changed in the tracking directions and the focusing directions by an interaction between a magnetic field generated by the print coils 205a and 205b and a magnetic field generated by the magnets 201a and 201b. In contrast to this, in the jitter directions, the piezoelectric element 203 expands and contracts on the basis of the electric power, so that the position of the lens holder 204 is changed.

<Second Configuration>

Figure 5:
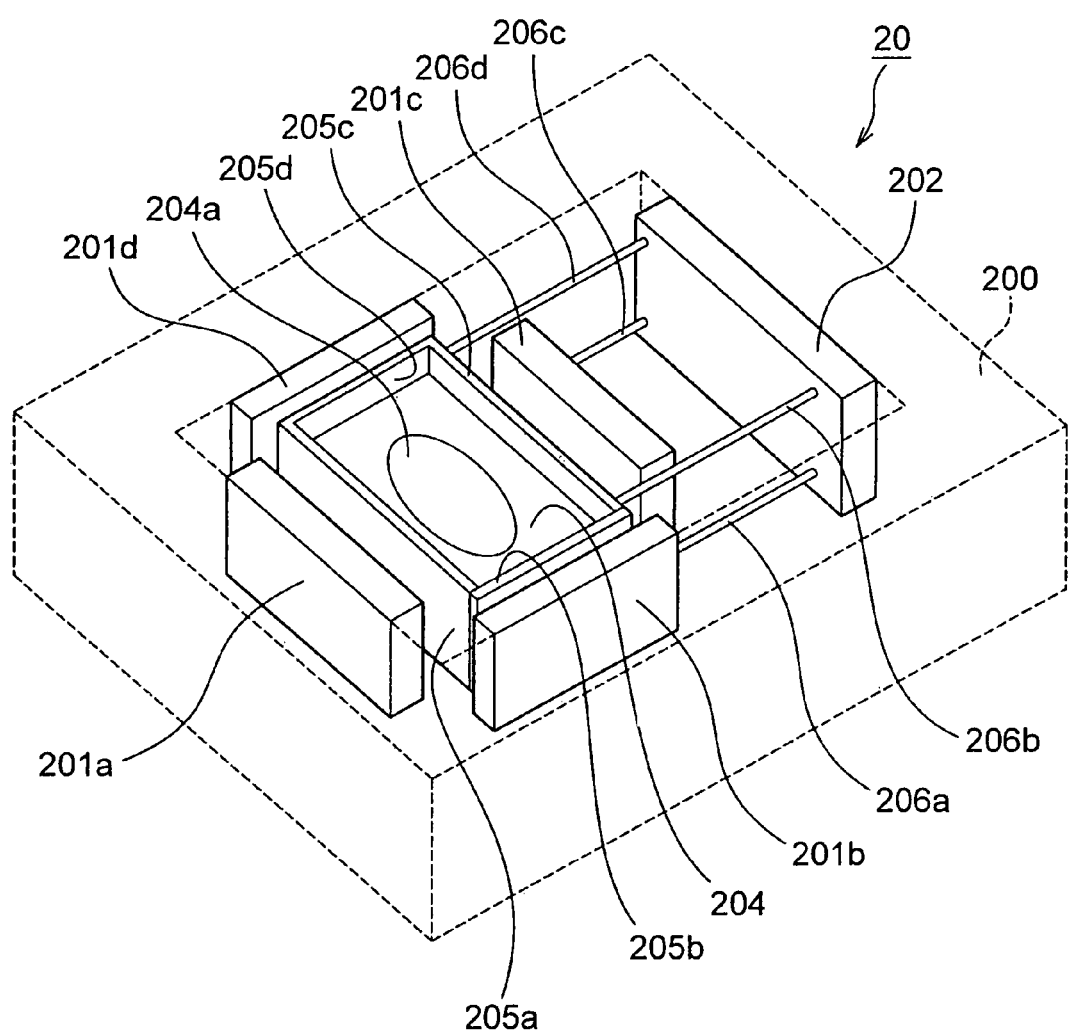
FIG. 5 is a diagram showing a second configuration of the sub-actuator section 20 according to the embodiment.

A second configuration of the sub-actuator section 20 is shown in FIG. 5. The same reference numerals as in FIG. 4 denote the same elements in FIG. 5. The sub-actuator section 20 according to the first configuration employs a configuration using a piezoelectric element to realize correction in the jitter directions. In contrast to this, in the configuration in FIG. 5, correction in the jitter directions is also tried to be realized by using an interaction obtained by magnetic fields.

In order to realize the functions, the sub-actuator section 20 according to the embodiment employs a configuration in which a lens holder 204 is surrounded by four magnets 201a, 202b, 201c, and 201d. In order to generate an interaction caused by a magnetic field with the four magnets 201a, 202b, 201c, and 201d, print coils 205a, 205b, 205c, and 205d are arranged on a side surface of the lens holder 204 opposing the four magnets 201a, 202b, 201c, and 201d. A drive power is designed to be supplied to the print coils 205a, 205b, 205c, and 205d through the suspension wires 206a 206b, 206c, and 206d.

(5) Specific Configuration of Wavelength Filter 18

A specific configuration of the wavelength filter 18 will be described below.

The wavelength filter 18 in the embodiment is consisted of, for example, a material called an EC (Electrochromic) material. This EC material is a material which causes an electrochroism phenomenon in which an absorption wavelength reversibly changes by an applied voltage. The material has a characteristic feature in which a transparent state changes into a color state by absorbing only beams having predetermined wavelengths by the applied voltage. As the EC material, there are materials of two types, i.e., an inorganic type and an organic type. As inorganic EC materials, for example, a cathode EC (colored by reduction) such as WO3 (tungsten trioxide) or MoO3 (molybdenum trioxide) using an electric absorption reaction and an anodic EC (colored by oxidation) such as Prussian blue (KxFeyFez(CN)6) or Ni(OH)n are known. As the organic EC material, a functional polymer such as polyphenazasiline used as an organic EL (Electro Luminescent) material is known.

Figure 6:
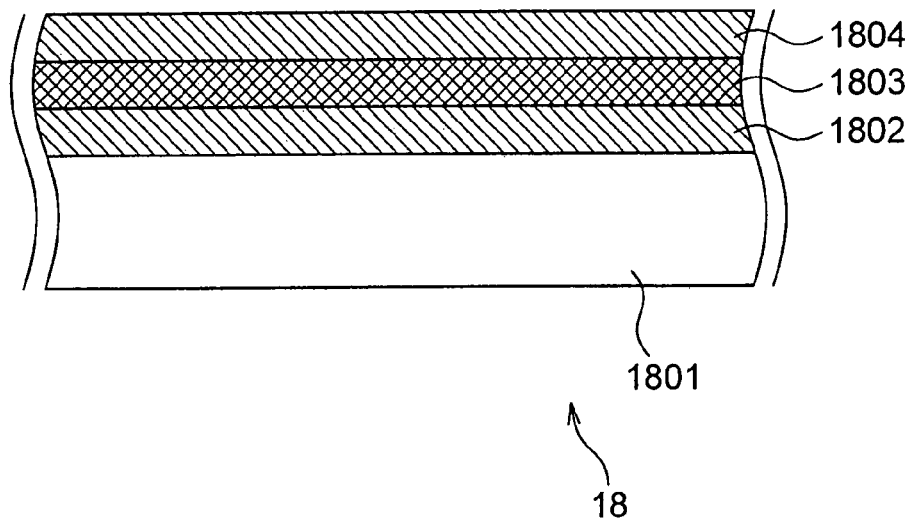
FIG. 6 is a diagram showing a configuration when a wavelength filter 18 according to the embodiment consists of an inorganic EC material.
Figure 7:
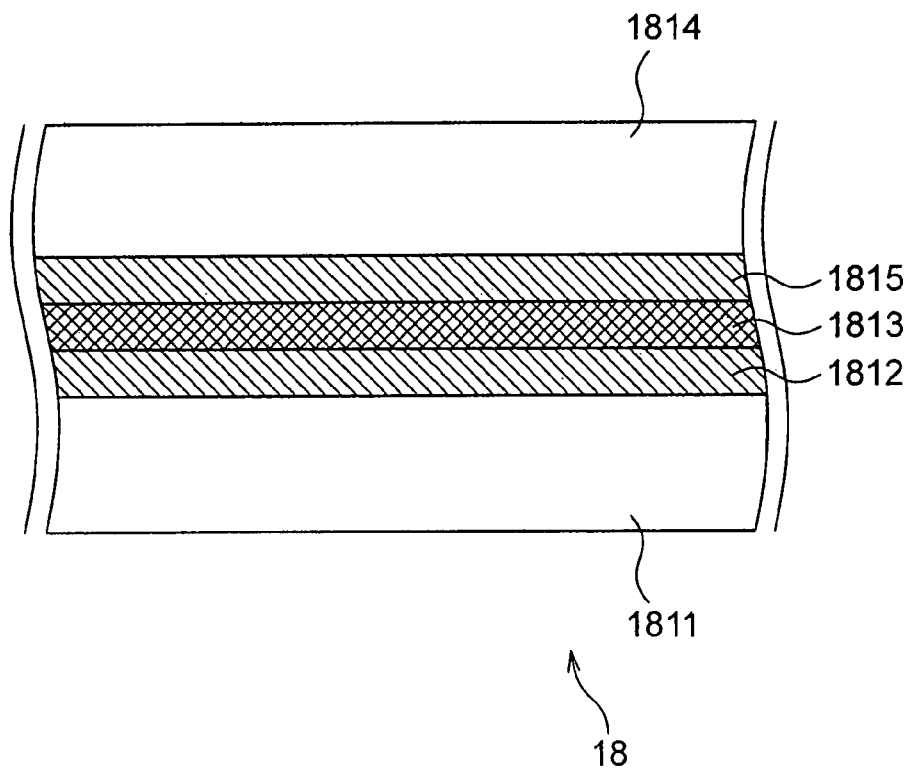
FIG. 7 is a diagram showing a configuration when the wavelength filter 18 according to the embodiment consists of an organic EC material.

FIG. 6 shows a configuration of the wavelength filter 18 when the inorganic EC is used, and FIG. 7 shows a configuration of the wavelength filter 18 when the organic EC is used.

In FIG. 6, reference numeral 1801 denotes a substrate which is consisted of a base material such as SiO2 (silicon dioxide) having a high transmittance. A transparent electrode 1802 is formed on the substrate 1801, and a film is formed on the transparent electrode 1802 by a method such as a Sol-Gel method, a pull method, or deposition and then sintered to form an EC layer 1803. On the EC layer 1803, a transparent electrode 1804 is further stacked. As a result, a state in which an electro-chromic layer 1803 is sandwiched between the transparent electrodes 1802 and 1804 is formed. Both the transparent electrodes 1802 and 1804 arranged on the wavelength filter 18 are respectively connected to the control section C. The control section C generates a potential difference between both the electrodes 1802 and 1804, so that an absorption wavelength in the EC layer 1803 is reversibly changed.

When the wavelength filter 18 is designed, a sharp absorption characteristic is desirably set between 660 nm to 780 nm. For example, when Prussian blue is used as the EC layer 1803, a potential difference of 0.2 V is given to change the color from achroma to blue, and a potential difference of 1.0 V is given to change the color from blue to green. Therefore, the potential difference is changed to make it possible to adjust the absorption wavelength to 780 nm or 660 nm. An appropriate film pressure is selected to make it possible to obtain a necessary filter characteristic at a low voltage. Depending on materials to be used, a plurality of EC layers 1803 consisting of different EC materials may be stacked to increase absorptivities of optical beams having respective wavelengths.

When the organic EC is used, the wavelength filter 18 is structured such that two transparent substrates 1811 and 1814 are stuck to each other with a gap and an organic EC material 1813 is filled between both the substrates. Transparent electrodes 1812 and 1815 are formed on opposing surfaces of the transparent substrates 1811 and 1814, the transparent electrodes 1812 and 1815 are connected to the control section C, and the control section C generates a potential difference between both the transparent electrodes 1812 and 1815 to reversibly change an absorption wavelength in the organic EC material 1813. In this case, the thickness, the applied voltage, and the like of the organic EC material 1813 must be appropriately designed as in the case where the above inorganic EC material is used.

In this case, when the wavelength filter 18 is employed, in addition to an optical beam to be transmitted and absorbed, an optical beam reflected by the wavelength filter 18 is generated. Therefore, when the wavelength filter 18 is arranged on a plane having an incident axis of the optical beam as a normal, the optical beam reflected on the wavelength filter 18 may be strayed on the optical axis. Therefore, the wavelength filter 18 is arranged at a predetermined angle θ with respect to the incident axis of the optical beam, and a reflected beam must be prevented from being generated on the incident axis in the wavelength filter 18.

When the wavelength filter 18 is arranged closer to the main actuator section 15 than the first beam splitter 13 and the second beam splitter, the optical beams output from both the optical sources 11 and 12 are absorbed or reflected before the optical beams are irradiated on the optical disk DK. For this reason, the wavelength filter 18 must be arranged closer to the photodetector 17 than both the beam splitters 13 and 14.

[1.2] Operation of Information Recording and Reproduction Apparatus RP

An operation performed when data is recorded on the optical disk DK such as a DVD-R, on/from which data can be recorded/reproduced by the information recording and reproduction apparatus RP according to the embodiment, will be described below.

When data is recorded on the optical disk DK in the information recording and reproduction apparatus RP, the control section C outputs a signal corresponding to data supplied from the signal processing section SP to the drive circuit D. The signal output from the control section C is amplified in the drive circuit D and supplied to both the first light source 11 and the second light source 12. As a result, first and second optical beams having recording powers are output from the first light source 11 and the second light source 12, respectively, and then irradiated on the optical disk DK through the optical section 2.

In this manner, the optical beam irradiated on the optical disk DK is incident to the cylindrical lens 19 through the optical system 2 again, given with astigmatism, and irradiated on the wavelength filter 18.

In conjunction with the series of operations, the wavelength filter 18 starts to supply the drive voltage VFC to the wavelength filter 18 and starts to supply the control pulse SCP to the line L connected to the switch SW1 and the switch SW2.

Figure 8:
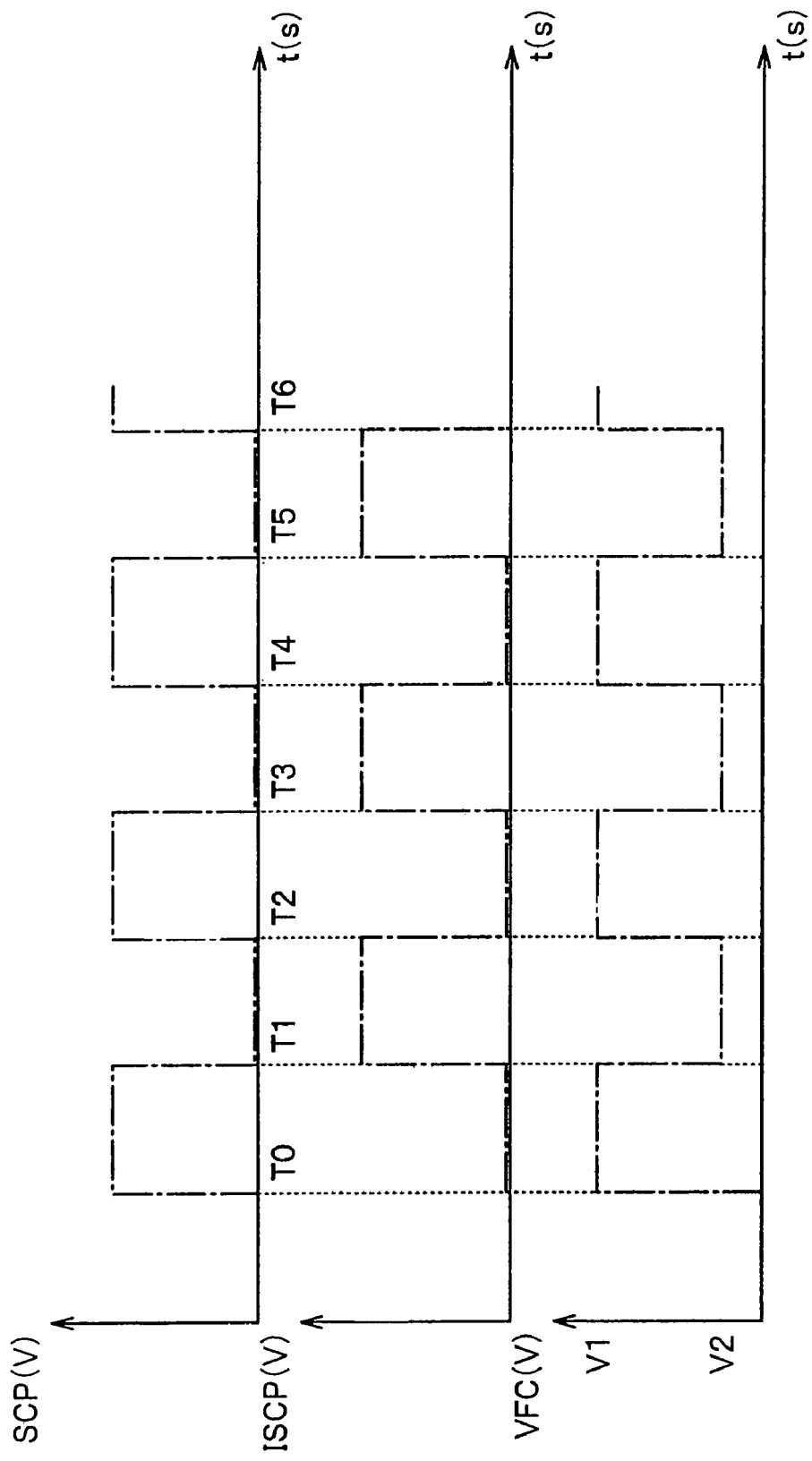
FIG. 8 is a diagram showing a relationship between signals output when a control section C records data on an optical disk DK in the embodiment.

A relationship between signals output when the control section C records data on the optical disk DK is shown in FIG. 8. In FIG. 8, a case in which control by the control section C is started from time T0.

At time T0, the control section C starts to supply the control pulse SCP and keeps a level of the control pulse SCP at "H" level for a period from time T0 to time T1. As a result, a voltage applied to the switch SW1 changes from "L" level to "H" level, and the switch SW1 is turned on.

On the other hand, the control pulse SCP is inverted in an inverter circuit I and output as an inversion control pulse ISCP. As a result, for a period from "times T0 to T1", the inversion control pulse ISCP is kept at "L" level, and the switch SW2 is kept in an off state.

As a result, for the period of times T0 to T1, the switch SW1 is turned on, and the switch SW2 is turned off, a drive power output from the main servo circuit MS is supplied to the main actuator section 15, and a drive power from the sub-servo circuit SS is cut off without being supplied to the sub-actuator section. In other words, during this period, in this state, only the control of the main actuator section 15 is performed.

In order to realize the control of the main actuator section 15 for the meantime, a state in which only the first reflected beam, i.e., a reflected beam of 660 nm for a DVD is received by the photodetector 17 is required. Therefore, the control section C keeps the value of the drive voltage VFC at "V1" for the period of times T0 to T1. As a result, an absorption wavelength in the wavelength filter 18 changes to around 780 nm. Of the reflected beams from the optical disk DK, the first reflected beam, i.e., only the reflected beam having a wavelength of 660 nm passes.

As a result, for the period of times T0 to T1, the photodetector 17 receives only the first reflected beam. Depending on the first reflected beam, the main actuator section 15 is driven.

At the time when T1 has come, the control section C changes the control pulse SCP to "L" level. At this time, an inversion control pulse on an output stage of the inverter circuit I changes into "H" level, the switch SW1 is turned off, and the switch SW2 is turned on. In this state, the drive power from the main servo circuit MS is cut off, and the drive power from the sub-servo circuit SS is supplied to the sub-actuator section 20, and optical axis correction is executed in the sub-actuator section 20.

In this case, the control section C changes value of the drive voltage VFC to "V2" to change an absorption wavelength in the wavelength filter 18. At this time, the wavelength of the reflected beam passing through the wavelength filter 18 is changed from 660 nm to 780 nm, and the reflected beam received by the photodetector 17 changes from the first reflected beam to the second reflected beam. As a result, for the period of times T1 to T2, on the basis of a light-receiving state of a reflected beam of the second reflected beam, i.e., the second optical beam for a CD, the sub-actuator section 20 is driven.

Thereafter, during times T2 to T3, the main actuator section 15 is driven, and during times T2 to T4, the sub-actuator section 20 is driven. The controls are sequentially repeated to drive the main actuator section 15 and the sub-actuator section 20 such that the focusing positions of the first reflected beam and the second reflected beam on the photodetector 17 are coincide with the central position of the photodetector 17.

In the above time-division control, when the switches SW1 and SW2 are turned off, drive signals (voltages) from the servo circuits which drive the respective actuators (i.e., the main actuator and the sub-actuator) are held in a sample holding circuit or the like in a switch-on state, so that control to the respective actuators can be smoothly performed.

In this manner, in the information recording and reproduction apparatus RP according to the embodiment, the optical pickup PU which has the first light source 11 and the second light source 12 simultaneously irradiating the first optical beam and the second optical beam on the optical disk DK and which receives reflected beams from the optical disk DK includes: the main actuator section 15 having an objective lens for focusing the first optical beam and the second optical beam on the optical disk DK; the sub-actuator section 20 having a sub-lens for changing a focusing irradiation position of the second optical beam on the optical disk DK; the wavelength filter 18 and the control section C which splits a reflected beam into a first reflected beam serving as the reflected beam of the first optical beam and a second reflected beam serving as a reflected beam of the second optical beam; the photodetector 17 which receives the first reflected beam to output a corresponding detection signal and receives the second reflected beam to output a corresponding detection signal, and the control section C and the sub-servo circuit SS which control the sub-actuator section 20 on the basis of the detection signal corresponding to the second reflected beam.

With the above configuration, even though displacement between the focusing spots f and s on the recording surface of the optical disk DK occurs, the sub-actuator section 20 is driven on the basis of the detection signal corresponding to the second reflected beam, and an irradiation direction of the second optical beam is changed by the sub-lens arranged in the sub-actuator section 20, so that the displacement between the focusing spots f and s is corrected.

For this reason, even though the configuration in which a plurality of optical beams are simultaneously irradiated on the optical disk DK is employed, error correction for tracking can be accurately performed while reliably making the focusing spots of the respective optical beam coincide with each other.

In particular, in the information recording and reproduction apparatus RP according to the embodiment, a correction signal is generated in the sub-servo circuit SS on the basis of the second reflected beam received by the photodetector 17, and the sub-actuator section 20 is controlled on the basis of the correction signal to correct displacement of the focusing spot s with respect to the focusing spot f. For this reason, both the focusing spots f and s can be made coincide with each other without complicating the apparatus configuration.

In the information recording and reproduction apparatus RP according to the embodiment, a movable mechanism for an objective lens is arranged in the main actuator section 15, and the main actuator section 15 is driven on the basis of the detection signal corresponding to the first reflecting beam. For this reason, even though displacement of the optical axis of the first optical beam with respect to the recording surface of the optical disk DK occurs, or even though the optical disk DK is bent, the objective lens is moved by the main actuator section 15 to make it possible to perform accurate tracking servo or focusing servo.

In the information recording and reproduction apparatus RP according to the embodiment, a transmission wavelength of the wavelength filter 18 is time-divisionally changed to split the first reflected beam and the second reflected beam in the wavelength filter 18, and both the reflected beams are time-divisionally received by the photodetector 17.

With this configuration, the main actuator section 15 is driven on the basis of the first reflected beam, the sub-actuator section 20 is driven on the basis of the second reflected beam, correction for tracking of the first optical beam is performed in the main actuator section 15, and a position of the focusing spot s of the second optical beam is changed with respect to the focusing spot f of the first optical beam after the correction, so that the positions of the focusing spots f and s of both the optical beams can be made coincide with each other.

Furthermore, in the embodiment, the wavelength filter 18 is consisted of a material which can change an absorption wavelength by an applied voltage, and the control section C changes the applied voltage to the wavelength filter 18 at a predetermined timing to split the first optical beam and the second optical beam. For this reason, the first optical beam and the second optical beam can be easily split without arranging a complex mechanism to control a transmission wavelength. The wavelength filter 18 is arranged on an optical path of the reflected beam at a predetermined angle to prevent the reflected beam from being strayed on the optical path.

Furthermore, the sub-actuator section 20 displaces the sub-lens in the focus directions, the tracking directions, and the jitter directions of the second optical beam to change the focus irradiation position of the second optical beam. With this configuration, the second optical beam is moved in the tracking and jitter directions to make it possible to reliably make the focusing spot positions of the first optical beam and the second optical beam coincide with each other. According to the configuration, focusing correction for the sub-actuator section 20 can be performed independently of the focusing correction of the main actuator section 15. Therefore, displacement between the focus positions based on the wavelength difference between the first and second optical beams can also be corrected.

The movable mechanism of the sub-actuator section 20 displaces the sub-lens by using a piezoelectric element to simplify the configuration and to contribute to downsizing of the sub-actuator section 20.

The embodiment describes an example in which the wavelength filter 18 is consisted of an EC material. However, the wavelength filter 18 is structured by using a material such as a cholestic liquid crystal the transmittance of which can be changed depending on the temperature, and a voltage supplied from the control section C is controlled, so that the wavelength filter 18 may transmit the optical beam having one of the wavelengths.

In the embodiment, the apparatus RP which records and reproduces information on/from the optical disk DK corresponding to both the standards of a CD and a DVD is described. However, for example, a apparatus which records and reproduces information on/from the optical disk DK conforming to the standards of a Blu-ray disk and a CD or the Blu-ray disk and a DVD can also be realized with the same configuration as described above.

Furthermore, in the embodiment, the optical beams output from the first light source 11 and the second light source 12 are directly irradiated on both the first beam splitter 13 and the second beam splitter 14. However, a diffraction grating may be arranged between the light source and the beam splitter to split the optical beams output from the first light source 11 and the second light source 12 into a main beam (0-degree diffracted light) and a sub-beam (±1-degree diffracted beam) and then irradiated on the first beam splitter 13 and the second beam splitter 14. However, when the configuration is employed, a region for receiving the main beam must be formed on the photodetector 17, the region must have a four-divided shape, and regions for receiving the sub-beam must be formed on the right and left of the region for receiving the main beam. The region for receiving the sub-beam has a horizontal-two-divided shape to make it possible to perform tracking servo and focusing servo using the sub-beam.

Still furthermore, in the information recording and reproduction apparatus RP according to the embodiment, the control section C and the drive circuit D are described with reference to the example in which the control section C and the drive circuit D are constituted by the apparatus such as a CPU independent of the optical pickup PU. However, the control section C and the drive circuit D may be integrated with the optical pickup PU.

Still further, in the embodiment, the movable mechanism of the objective lens is arranged in the main actuator section 15. However, when the optical axis of the first optical beam is accurately adjusted, the movable mechanism of the objective lens is not necessarily required.

The embodiment employs the configuration in which the sub-actuator section 20 is arranged on the optical path of the second optical beam from the second light source 12 to the second beam splitter 14. However, without arranging the sub-actuator section 20, a configuration in which the second light source 12 is fixed to the housing through a piezoelectric element and a voltage is applied to the piezoelectric element to move the second light source 12 itself may be employed.

[1.3] Modification of First Embodiment (1) Modification 1-1

The information recording and reproduction apparatus RP according to the first embodiment employs a configuration in which the photodetector 17 has a four-divided shape and the main servo circuit MS and the sub-servo circuit SS are constituted by the arithmetic operation circuits as shown in FIG. 3 to acquire correction signals used in control of the sub-actuator section 20 by one photodetector 17.

However, a photodetector to acquire a tracking error signal and a focus error signal and a photodetector to acquire a jitter error signal can be independently structured.

When the configuration is employed, for example, a half-mirror (transmits 50% and reflects 50%) is arranged between the wavelength filter 18 and the focusing lens 16 to split a reflected beam. The reflected beams split by the half-mirror are received by two photodetectors, respectively. Even though the configuration is employed, the shapes of the photodetectors to acquire a tracking error signal and a focus error signal and the configuration of an arithmetic operation circuit are the same as those in FIG. 3.

Figure 9:
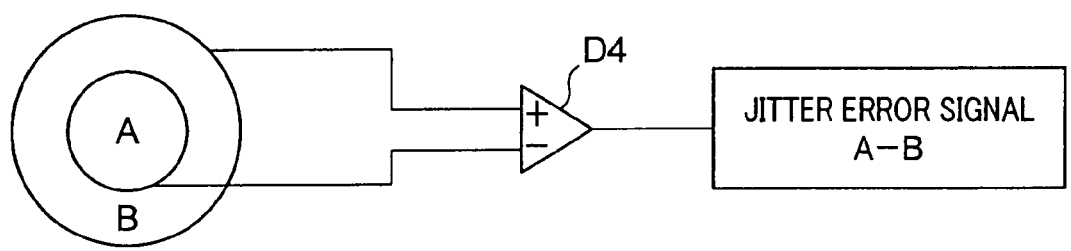
FIG. 9 is a diagram showing an example of a circuit configuration of a photodetector and a sub-servo circuit SS to acquire a jitter error signal in a modification 1-1 of the first embodiment.
Figure 10:
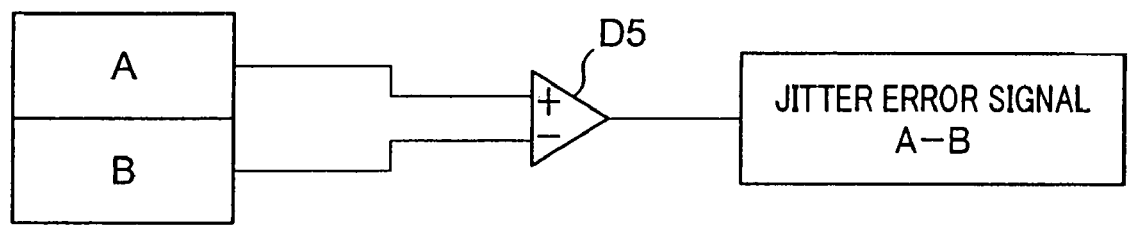
FIG. 10 is a diagram showing an example of the circuit configuration of the photodetector and the sub-servo circuit SS to acquire a jitter error signal in the modification 1-1 of the first embodiment.

On the other hand, a photodetector to acquire a jitter error signal and an arithmetic operation circuit employ, for example, the configuration shown in FIG. 9 or FIG. 10. In the example shown in FIG. 9 the photodetector for the jitter error signal must be structured to be divided into two circles A and B the centers of which are coincide with each other. A difference between a detection signal on the circle A and a detection signal on the circle B is calculated by a difference circuit D4 and used as a jitter error signal.

In contrast to this, in the example shown in FIG. 10, a photodetector for a jitter error signal is divided by two in jitter directions, and detection signals respectively from regions A and B is calculated by a difference circuit D5 to acquire a jitter error signal.

The other parts are the same as those in the first embodiment. According to this modification, correction signals to drive the sub-actuator section 20 can be acquired by a method different from that in the first embodiment.

(2) Modification 1-2

The information recording and reproduction apparatus RP according to the first embodiment employs the configuration in which a focus error signal is acquired by using the astigmatic method and focus correction is performed on the basis of the focus error signal. However, it attracts attention that the detection signals output from all the regions A, B, C, and D, i.e., an RF signal level is peaked in a just focus state. In other words, so-called Hill climbing method can also correct a focus error. When this method is employed, the servo circuits MS and SS perform focus correction in a constant direction in recording/reproducing data on/from the optical disk DK. As a result, when the RF signal level lowers, correction is performed in a direction opposing the correction direction. When the RF signal level rises, correction is performed in the same direction as the correction direction.

(3) Modification 1-3

Figure 11:
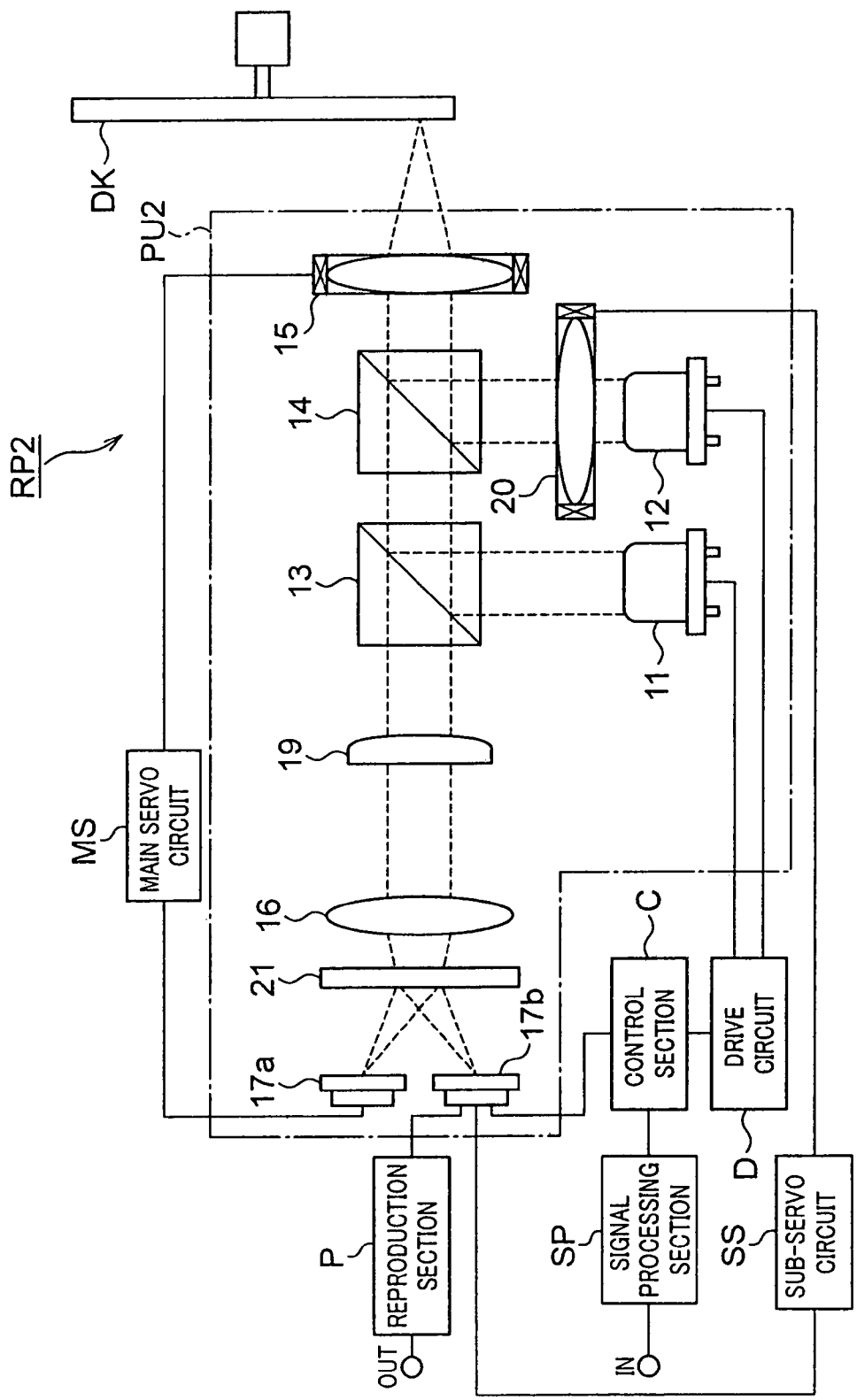
FIG. 11 is a block diagram showing a configuration of an information recording and reproduction apparatus RP2 in a modification 1-3 of the first embodiment.

FIG. 11 is a block diagram showing the configuration of an information recording and reproduction apparatus RP2 according to the modification. The same reference numerals as in FIG. 1 denote the same elements in FIG. 11.

The information recording and reproduction apparatus RP according to the first embodiment employs the configuration in which the first reflected beam and the second reflected beam are split by using the wavelength filter 18 and time-divisionally received to cause the photodetector 17 to receive both the first and second reflected beams. In contrast to this, in the information recording and reproduction apparatus RP2 according to the modification, two photodetectors 17a and 17b are arranged in a optical pickup PU2 to cause the photodetector 17a to receive a first reflected beam, i.e., a reflected beam having a wavelength of 660 nm and to cause the photodetector 17b to receive a second reflected beam, a main actuator section 15 is driven on the basis of a light-receiving result in the photodetector 17a, and the sub-actuator section 20 is driven on the basis of a light-receiving result in the photodetector 17b. A dividing method for both the photodetectors 17a and 17b and the specific configurations of the main servo circuit MS and the sub-servo circuit SS are the same as those in FIG. 3.

In order to realize these functions, no wavelength filter 18 is arranged in the optical pickup PU2 of the information recording and reproduction apparatus RP2 according to the modification. Alternatively, a wavelength dividing element 21 is arranged between a focusing lens 16 and both the photodetectors 17a and 17b. The wavelength dividing element 21 is constituted by, for example, a grating, splits a reflected beam irradiated through the focusing lens 16 into a first reflected beam and a second reflected beam, focuses the first reflected beam on the photodetector 17a, and focuses the second reflected beam on the photodetector 17b. On the basis of light-receiving states in both the photodetectors 17a and 17b, the main actuator section 15 and the sub-actuator section 20 are driven. When the configuration is employed, as in the first embodiment, since a control to realize time-divisional light reception need not be performed, switches SW1 and SW2 need not be arranged, and there is no necessity of outputting a control pulse SCP from a control section C.

In this manner, the information recording and reproduction apparatus RP2 according to the modification has a configuration in which optical beams having different wavelengths are irradiated from a first light source 11 and a second light source 12, reflected beams of the first optical beam and the second optical beam are diffracted by the wavelength dividing element 21 and split, and the split reflected beams are received by the two photodetectors 17a and 17b.

With this configuration, the first reflected beam and the second reflected beam split by the wavelength dividing element 21 are received by the different photodetectors 17a and 17b, respectively. The main actuator section 15 and the sub-actuator section 20 are controlled on the basis of detection signals obtained in the photodetectors 17a and 17b. For this reason, correction for tracking, jitter, and focusing can be performed by using reflected beams received by both the photodetectors 17a and 17b on real time without performing time-divisional light reception. Therefore, the apparatus and the control can be simplified.

[2] Second Embodiment

Figure 12:
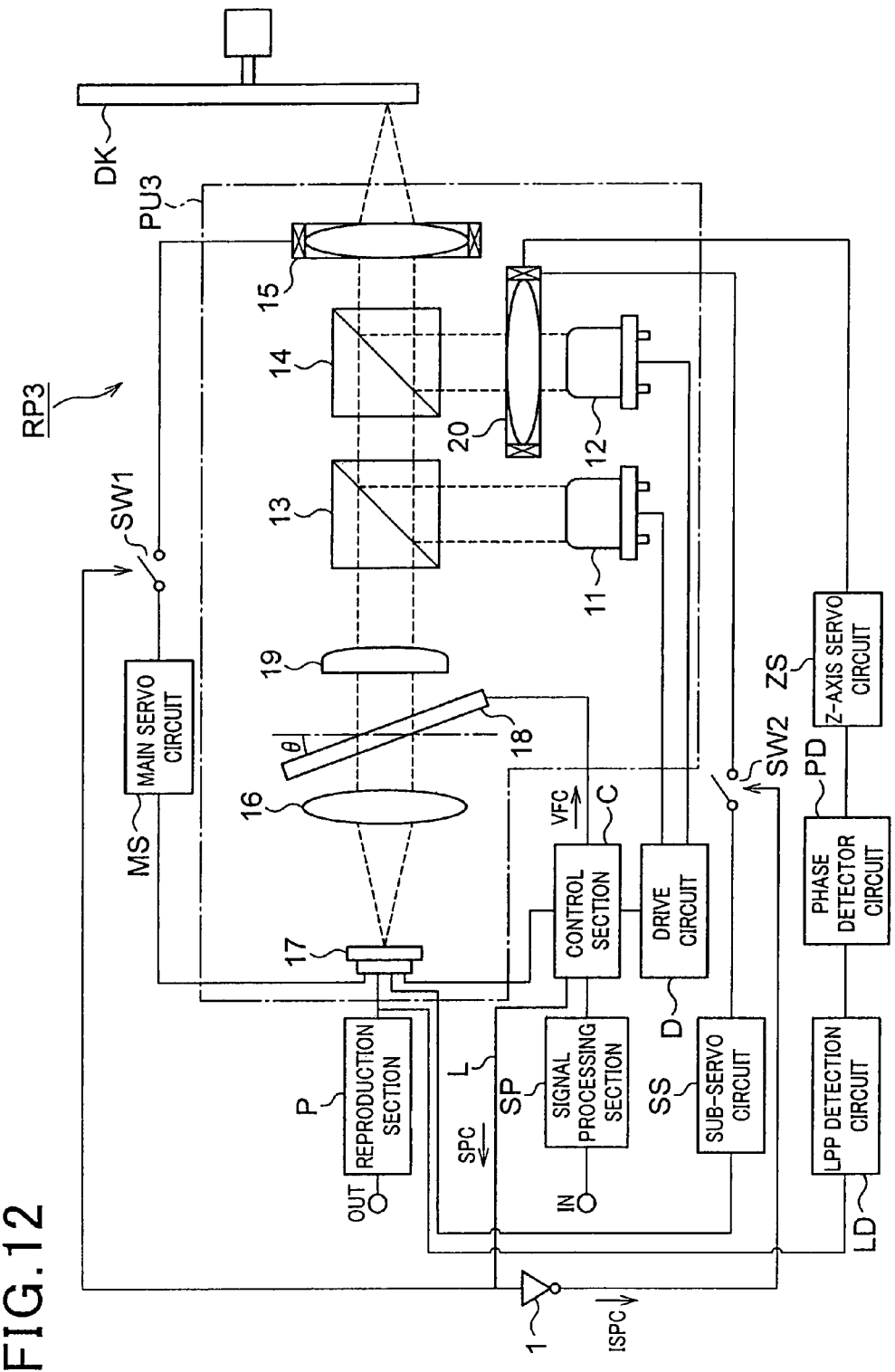
FIG. 12 is a block diagram showing a configuration of an information recording and reproduction apparatus RP3 in a second embodiment.

FIG. 12 is a block diagram showing the configuration of an information recording and reproduction apparatus RP3 according to a second embodiment of the invention. The same reference numerals as in FIG. 1 denote the same parts in FIG. 12.

In this case, the information recording and reproduction apparatus RP according to the first embodiment employs the configuration in which the sub-servo circuit SS is constituted by an arithmetic operation circuit as shown in FIG. 3 to acquire a tracking error signal, a focus error signal, and a jitter error signal in the sub-servo circuit SS, and, on the basis of these signals, the sub-actuator section 20 is driven. In contrast to this, the information recording and reproduction apparatus RP3 according to the embodiment employs a configuration in which only tracking and focus are corrected by a sub-servo circuit SS and correction in jitter directions is performed by another circuit.

A specific correction method is as follows.

Usually, wobbled groove tracks and land tracks are alternately arranged on a optical disk DK conforming to DVD-R and DVD-RW standards, and pits called land pre-pits (hereinafter, referred to as "LPP") are formed on the land tracks in a predetermined cycle, and addresses and disk information on the disk are recorded by the LPPs. The LOPPs are detected as peak-like changes of a light-receiving signal at the time of recording/reproducing data on/from the optical disk DK (hereinafter, referred to a "LPP signal" in discrimination from the light-receiving signal) and used in control of address management or the like.

Figure 13:
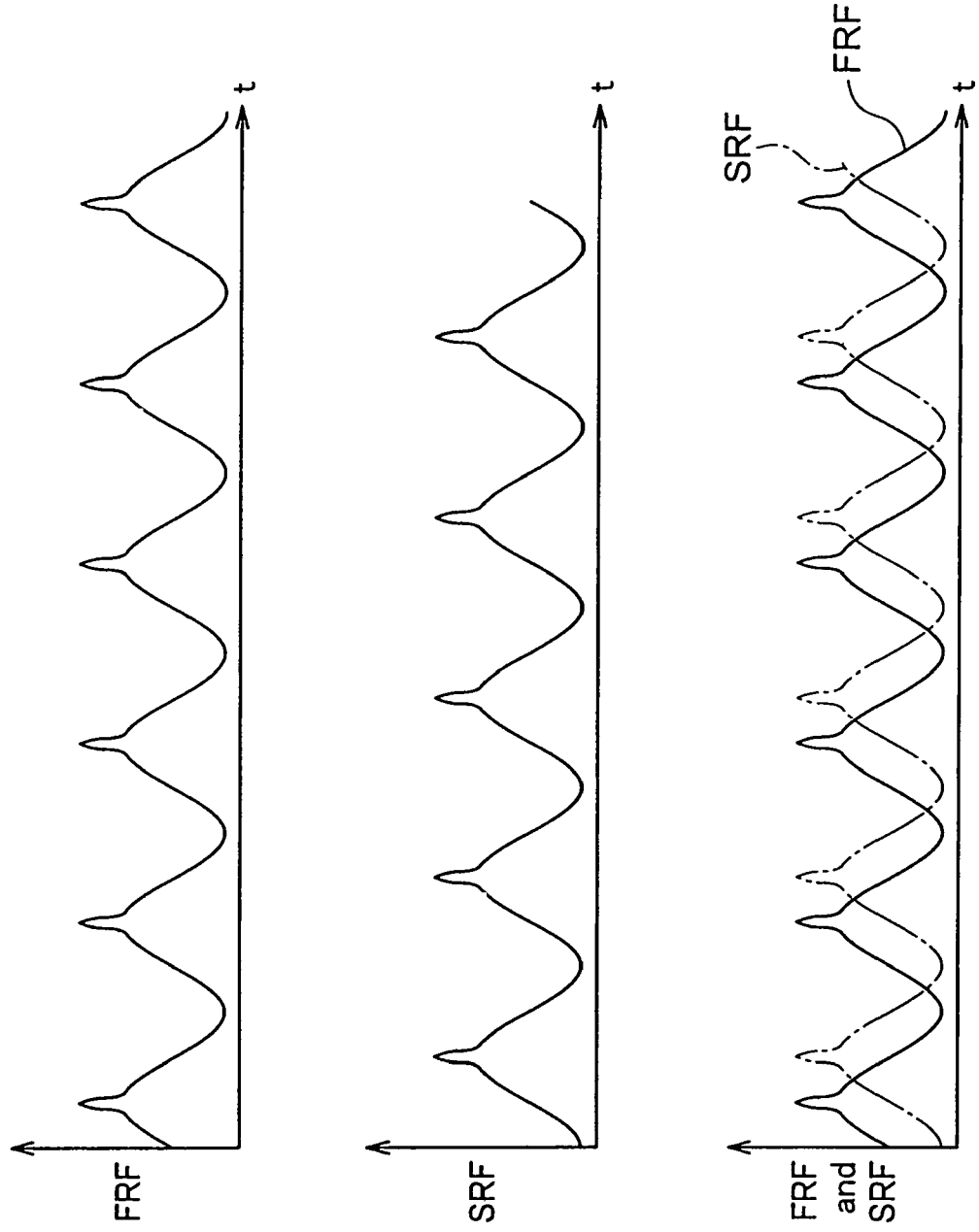
FIG. 13 is a schematic diagram showing a change in state of a received signal obtained in the photodetector 17 when displacement of optical axes between a first optical beam and a second optical beam in the information recording and reproduction apparatus RP3 in the embodiment.

In the embodiment, by paying attention to a change of the light-receiving signal by the LPP, a correction amount in jitter directions is calculated by the following method. First, it is assumed that displacement of optical axes between a first optical beam (for DVD) and a second optical beam (for CD) occurs in the jitter directions. In this case, as shown in FIG. 13, a phase difference is generated between a light-receiving signal FRF obtained by the first reflected beam and a light-receiving signal SRF obtained by the second reflected beam, and the phase difference causes a difference between generation timings of the LPP signals, i.e., the phases.

On the other hand, in a state in which displacement of optical axes does not occur in the jitter directions, a phase difference is not generated between the light-receiving signals FRF and SRF, and the phases of the LPP signals are equal to each other. Therefore, when the sub-actuator section 20 is driven in a direction in which the phase difference between the light-receiving signals FRF and SRF, i.e., a phase difference between the LPP signals is eliminated, displacement between focusing spots f and s (see FIG. 2) in the jitter directions is corrected.

Therefore, in the information recording and reproduction apparatus RP according to the embodiment, in order to calculate a correction amount in the jitter directions and drive the sub-actuator section 20 in the jitter directions on the basis of the calculated value, an LPP detection circuit LD, a phase detector circuit PD, and a Z-axis servo circuit ZS are arranged.

The LPP detection circuit LD acquires a light-receiving signal output from the photodetector 17, separates a component corresponding to a first reflected beam (for DVD) of the LPP signal included in the light-receiving signal from a component corresponding to a second reflected beam (for CD) to output the components to phase detectors PD by respective different systems. At this time, the light-receiving signal may be directly input to the phase detector circuit PD without removing a wobbling signal component in an RF signal in the LPP detection circuit LD.

Here, in the case of this embodiment, since the first and second reflected beams are time-divisionally received by the photodetector 17, when the light-receiving signals corresponding to both the reflected beams are divided, a normal LPP signal cannot be acquired, and the LPP signal is intermittently acquired. Therefore, the LPP detection circuit LD according to the embodiment employs a configuration in which an RF signal time-divisionally obtained is interpolated by using a method such as a linear prediction method.

The phase detector circuit PD compares phases of first reflected beam components and second reflected beam components of the LPP signals input from the LPP detection circuit LD to the different systems and changes a voltage level of a signal output to the Z-axis servo circuit ZS on the basis of the phase difference.

The Z-axis servo circuit ZS calculates a correction amount in the jitter directions and a correction direction on the basis of the voltage level of the signal supplied from the phase detector circuit PD and supplies a drive voltage to the sub-actuator section 20 depending on the calculation result. A specific calculating method is arbitrarily selected. A table of amounts of correction and correction directions corresponding to voltage levels may be held, and the calculation may be performed on the basis of the table.

On the other hand, in the embodiment, a jitter error signal need not to be generated in the sub-servo circuit SS. For this reason, the sub-servo circuit SS has the same configuration as that in the main servo circuit MS and is constituted by adder circuits P1 to P4 and difference circuits D1 and D2.

The other configuration is the same as that in the information recording and reproduction apparatus RP shown in FIG. 1.

As described above, in the information recording and reproduction apparatus RP3 according to the embodiment, an LPP detection circuit LD and a phase detector circuit PD which specify a phase difference of an LPP signal included in a light-receiving signal output from the photodetector 17 are arranged. A correction amount of the sub-lens of the sub-actuator section 20, i.e., a displacement magnitude in the jitter directions is calculated on the basis of the phase difference, and the sub-actuator section 20 is driven on the basis of the calculation result.

With this configuration, a correction amount of the sub-actuator section 20 is calculated on the basis of the light-receiving signal, and the sub-actuator section 20 is driven depending on the calculation result. For this reason, the sub-actuator section 20 is driven by a method different from that in the first embodiment, so that focusing spots f and s of the first optical beam and the second optical beam can be made coincide with each other.

The information recording and reproduction apparatus RP3 according to the embodiment employs a configuration in which the LPP signal included in the light-receiving signal is separated by using the LPP detection circuit LD into a component corresponding to a first reflected beam and a component corresponding to a second reflected beam and the sub-actuator section 20 is driven by the phase detector circuit PD and the Z-axis servo circuit ZS on the basis of the phase difference between both the LPP signals. However, for example, when the optical disk DK conforming to the standards DVD+R or DVD+RW is used, a correction amount in the jitter directions cannot be calculated by using an LPP signal because an LPP is not arranged. Therefore, in recording of data on the optical disk DK conforming to these standards, without using an LPP signal, wobbling signal components included in, for example, light-receiving signals must be compared with each other to calculate a correction amount.

[3] Third Embodiment

[3.1] Configuration and Operation of Third Embodiment

Figure 14:
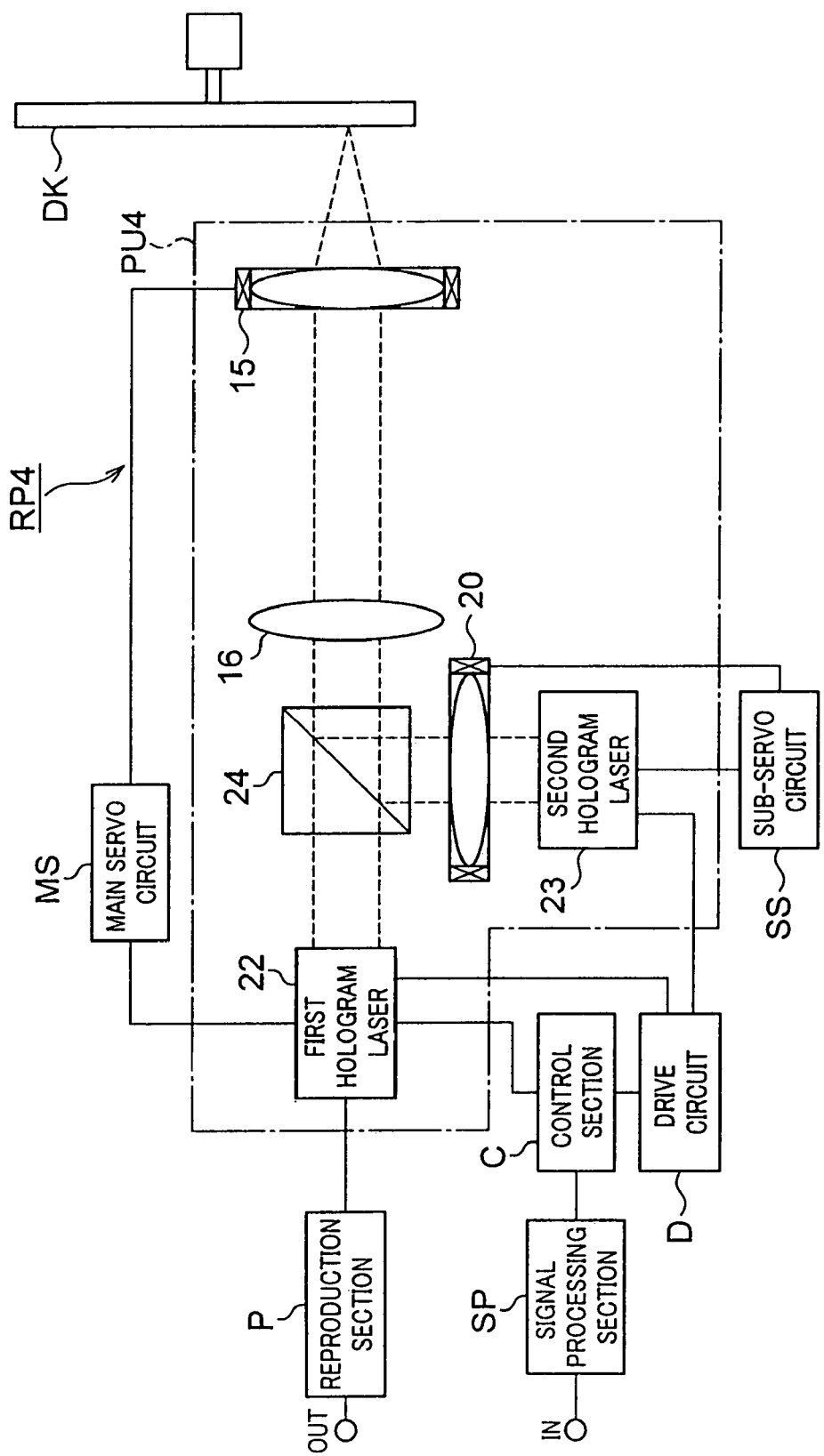
FIG. 14 is a block diagram showing a configuration of an information recording and reproduction apparatus RP4 according to a third embodiment.

FIG. 14 is a diagram showing the configuration of an information recording and reproduction apparatus RP4 according to the embodiment. The same reference numerals as in FIG. 1 denote the same parts in FIG. 14.

In this case, in the information recording and reproduction apparatus RP according to the first embodiment, the first light source 11 (wavelength: 660 nm) for a DVD and the second light source 12 (wavelength: 780 nm) for a CD are simultaneously lit on when data is recorded on the optical disk DK such as a DVD±R on/from which data can be recorded and reproduced to increase an amount of light of an optical beam irradiated on the optical disk DK so as to increase a recording speed of the data. In contrast to this, in the information recording and reproduction apparatus RP4 according to the embodiment, two light sources which output optical beams each having a wavelength of 660 nm are arranged, and both the light sources are simultaneously lit on in data recording on the optical disk DK such as a DVD±R or a DVD±RW so as to increase an amount of energy of the optical beam irradiation on the optical disk DK.

In order to realize the functions, in an optical pickup PU4 of the information recording and reproduction apparatus RP4 according to the embodiment, a main actuator section 15, a focusing lens 16, and a sub-actuator section 20 are arranged, and a first hologram laser 22 (hereinafter, "hologram laser" will be abbreviated as "H laser"), a second H laser 23, and a beam splitter 24 are further arranged.

Each of the first H laser 22 and the second H laser 23 has a configuration in which a laser chip for outputting an optical beam having a wavelength of 660 nm and a light-receiving element are arranged on the same circuit board and a hologram element is arranged opposing an output side of the optical beam on the circuit board. This hologram element directly transmits an optical beam output from the laser chip and deflects an optical beam being incident from a plane opposing a plane of incidence of the optical beam to focus the optical beam to the light-receiving element on the circuit board.

In the embodiment, in data recording on the optical disk DK, optical beams are output from both the H lasers 22 and 23.

As in the embodiment, when two optical beams having equal wavelengths are used, efficiency of use of the optical beams can be improved in comparison with a case in which optical beams having different wavelengths are used, and a recording speed higher than that in the information recording and reproduction apparatus RP according to the first embodiment can be obtained. On the other hand, in order to correct displacement of optical axes occurred, a method of splitting the optical beams having equal wavelengths is posed as a problem. In the embodiment, in order to solve the problem, the following method is employed.

First, a configuration in which a configuration, which outputs optical beams linearly polarized with respect different planes of polarization, are output respectively from the first H laser 22 and the second H laser 23 is employed. A direction of the linear polarization and a polarizing method are arbitrary determined. However, in the embodiment, wavelength plates are arranged in the H lasers 22 and 23, respectively, and an explanation will be made such that the optical beam from the first H laser 22 is P-polarized (TE wave) and the optical beam from the second H laser 23 is S-polarized (TM wave) (the optical beams will be called a "P-polarized optical beam" and a "S-polarized optical beam").

On the optical paths extending from the first H laser 22 and the second H laser 23, a PBS (polarized-beam splitter) is arranged as the beam splitter 24 to transmit the P-polarized optical beam and reflect the S-polarized optical beam. As a result, the optical beam output from the first H laser 22 passes through the beam splitter 24 and the focusing lens 16 and is focused on the optical disk DK by the objective lens of the main actuator section 15 and reflected. Thereafter, the optical beam is received by the first H laser 22 again through the objective lens, the focusing lens, and the beam splitter 24.

On the other hand, the optical beam output from the second H laser 23 passes through the sub-lens of the sub-actuator section 20 and is reflected by the beam splitter 24 and focused on the optical disk DK through the focusing lens 16 and the objective lens. The optical beam is reflected by the optical disk DK, passes through the objective lens and the focusing lens 16, and is reflected by the beam splitter 24. Thereafter, the optical beam is received by the second H laser 23 through the sub-lens.

Since the reflection of the optical beam on the optical disk DK is fixed-end reflection, a phase difference is not generated. Therefore, since a plane of polarization does not change, the right-receiving configuration is realized. However, in the case where a ¼ wavelength plate is arranged between the beam splitter 24 and the main actuator section 15, since the plane of polarization changes when the optical beam passes through the wavelength plate, the light-receiving configuration cannot be realized. Therefore, in the embodiment, an explanation is made on the assumption that no wavelength plate is arranged. A configuration in which the wavelength plate is arranged will be described later.

In the information recording and reproduction apparatus RP4 having the above configuration, the P-polarized optical beam and the S-polarized optical beam are output from both the first H laser 22 and the second H laser 23 in recording of data on the optical disk DK such as a DVD-R and focused on the optical disk DK. In order to make focusing spots of both the optical beams coincide with each other, the main actuator section 15 is driven by the main servo circuit MS on the basis of a detection signal obtained in the first H laser 22. A correction amount of the sub-actuator section 20 is calculated in the sub-servo circuit SS on the basis of a detection signal in the second H laser 23.

The circuit configurations of the main servo circuit MS and the sub-servo circuit SS and divided shapes of light-receiving elements arranged in the first and second H lasers 22 and 23 are the same as those in FIG. 3 described above. In the embodiment, time-divisional light receiving need not be realized unlike in the information recording and reproduction apparatus RP according to the first embodiment. For this reason, a line L to output a control pulse SCP from a control section C need not be arranged.

In this manner, in the information recording and reproduction apparatus RP4 according to the embodiment, the P-polarized optical beam and the S-polarized optical beam polarized in respective different polarization directions are output from the first H laser 22 and the second H laser 23, and reflected beams corresponding to the respective optical beams are split by the beam splitter 24 (polarized beam splitter), and the split beams are received by the first H laser 22 and the second H laser, respectively. For this reason, even though a plurality of optical beams having equal wavelengths are used to increase an amount of energy of an optical beam irradiated on the optical disk DK, both the optical beams must be split, and focusing spot positions corresponding to both the optical beams must be made coincide with each other.

The embodiment employs a configuration in which the sub-actuator section 20 is arranged on an optical path of the S-polarized optical beam from the second H laser 23 to the beam splitter 24. However, even though the sub-actuator section 20 is not arranged, a laser chip arranged in the second H laser 23 is fixed to the housing through a piezoelectric element, and a voltage is applied to the piezoelectric element, so that the laser chip itself may be moved.

[3.2] Modification of Third Embodiment (1) Modification 3-1

As described above, the information recording and reproduction apparatus RP4 employs a configuration in which a ¼ wavelength plate is not arranged. However, in order to assure an S/N (Signal/Noise) ratio of the optical pickup PU4, a ¼ wavelength plate is desirably arranged between the beam splitter 24 and the main actuator section 15. Therefore, the modification shows a configuration in which a ¼ wavelength plate is arranged between the focusing lens 16 and the beam splitter 24.

As described above, the ¼ wavelength plate is arranged, the optical beams (P-polarized beam and S-polarized beam) output from the first and second H lasers 22 and 23 are circularly polarized by the ¼ wavelength plate and irradiated on the focusing lens 16. Reflected beams corresponding to the optical beams are polarized by the ¼ wavelength plate again, and the states of the reflected beams return to linearly polarized states.

In this case, when these processes are performed, phase differences each having ¼ wavelength are generated on an outward path and a homeward path, respectively. As a result, the P-polarized optical beam kept S-polarized on the homeward path is incident to the beam splitter 24. On the other hand, the S-polarized optical beam kept P-polarized is incident to the beam splitter 24.

As a result, the optical beam output from the first H laser 22 is received by the second H laser 23, and the optical beam output from the second H laser 23 is received by the first H laser 22. Therefore, when the ¼ wavelength plate is arranged, a correction amount of the main actuator section 15 must be calculated on the basis of a detection signal in the second H laser 23, and a correction amount of the sub-actuator section 20 must be calculated on the basis of a detection signal in the first H laser 22.

When the configuration is employed, even though the same configuration as that in the information recording and reproduction apparatus RP4 is employed, the ¼ wavelength plate is arranged to make it possible to assure an S/N ratio in the optical pickup PU4.

(2) Modification 3-2

In the information recording and reproduction apparatus RP4 according to the third embodiment, the sub-servo circuit SS has the same circuit configuration as in FIG. 3, and the configuration, in which amounts of correction in the tracking, focus, and jitter directions, are calculated by the sub-servo circuit SS is employed. However, the correction amount in the jitter directions may be calculated by using an LPP signal as in the second embodiment.

Figure 15:
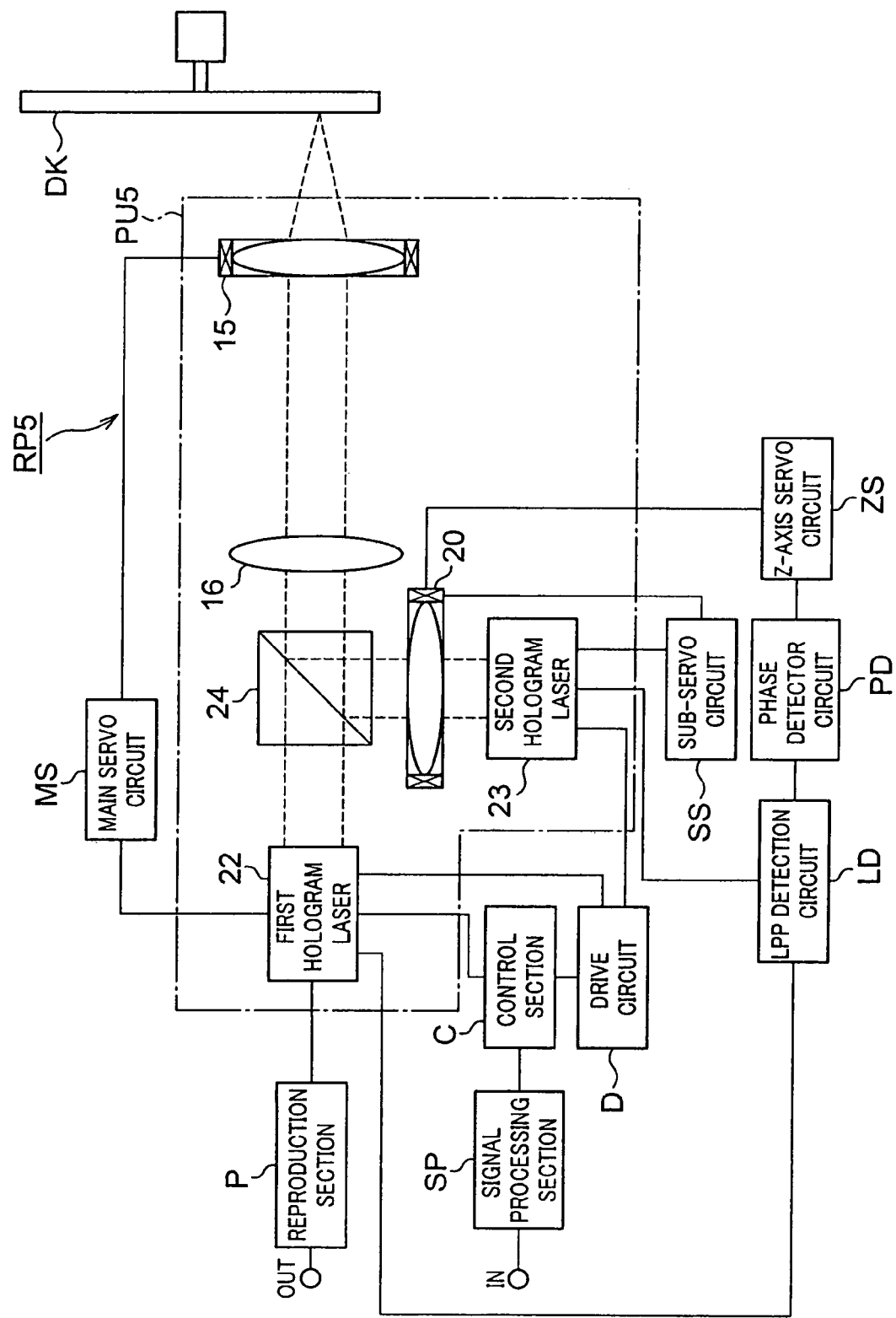
FIG. 15 is a block diagram showing a configuration of an information recording and reproduction apparatus RP5 in a modification 3-2 of the third embodiment.

The configuration of an information recording and reproduction apparatus RP5 according to the modification, which employs the above configuration, is shown in FIG. 15. The same reference numerals as in FIG. 14 denote the same elements in FIG. 15.

As shown in FIG. 15, the information recording and reproduction apparatus RP5 according to the embodiment includes, in addition to respective elements included in the information recording and reproduction apparatus RP4 shown in above FIG. 14, an LPP detection circuit LD, a phase detector circuit PD, and a Z-axis servo circuit ZS. The LPP detection circuit LD, the phase detector circuit PD, and the Z-axis servo circuit ZS are the same elements as those in the second embodiment. More specifically, the LPP detection circuit LD acquires light-receiving signals respectively from the first H laser 22 and the second H laser 23, separates LPP signals included in the light-receiving signals, and outputs the LPP signals to the phase detector circuit PD by respective different systems. The phase detector circuit PD compares the LPP signal from the first H laser 22 with the LPP signal from the second H laser 23, and the Z-axis servo circuit ZS drives the sub-actuator section 20 in a direction in which a phase difference between both the LPP signals is eliminated.

With the above configuration, since a jitter error signal need not be generated in the sub-servo circuit SS, the sub-servo circuit SS has the same circuit configuration as that of the main servo circuit MS. This point is also the same as that in the above second embodiment.

A specific processing method is the same as that in the above second embodiment. In the information recording and reproduction apparatus RP5 according to the modification, time-divisional light reception is not performed, and reflected beam are received by the first H laser 22 and the second H laser 23 at any time. For this reason, unlike in the second embodiment, the light-receiving signal need not be interpolated in the LPP detection circuit LD.

In this manner, according to the information recording and reproduction apparatus RP5 according to the information recording and reproduction apparatus RP5 according to the embodiment, even when optical beams having equal wavelengths are simultaneously irradiated, as in the second embodiment, a correction amount of the sub-actuator section 20 in the jitter directions is calculated on the basis of the LPP signal, and the sub-actuator section 20 can be driven on the basis of the calculation result.

The invention claimed is:

1. An optical pickup apparatus which has a first light source and a second light source which simultaneously irradiate a first optical beam and a second optical beam on an information recording medium and receives reflected beams of the first optical beam and the second optical beam from the information recording medium, the optical pickup apparatus comprising:
    an objective lens for focusing the first optical beam and the second optical beam on the information recording medium;
    an irradiation position changing device having a sub-lens and displacing the sub-lens in focus directions, tracking directions, and jitter directions of the second optical beam to displace a focus irradiation position of the second optical beam for changing the focus irradiation position of the second optical beam on the information recording medium;
    a splitter device for splitting the reflected beams into a first reflected beam serving as the reflected beam of the first optical beam and a second reflected beam serving as the reflected beam of the second optical beam respectively;
    a light-receiving device for receiving the first reflected beam to output a first light-receiving signal and which receives the second reflected beam to output a second light-receiving signal; and
    a control device for controlling the irradiation position changing device on the basis of the second light-receiving signal to correct displacement of the focus irradiation position of the second optical beam with respect to the focus irradiation position of the first optical beam.

2. The optical pickup apparatus according to claim 1, further comprising:
    a lens moving device for displacing an arrangement position of the objective lens; and
    a lens control device for controlling the lens moving device on the basis of the first light-receiving signal.

3. The optical pickup apparatus according to claim 1, wherein
    the first light source and the second light source irradiate optical beams each having different wavelengths, and
    the splitter device further has a filter for changing a transmission wavelength of the optical beam and filter control device for controlling a transmission wavelength of the filter.

4. The optical pickup apparatus according to claim 3, wherein
    the filter control device time-divisionally changes the transmission wavelength of the filter to cause the light-receiving device to time-divisionally receive any one of the first reflected beam and the second reflected beam.

5. The optical pickup apparatus according to claim 3, wherein
    the filter is consisted of a material the absorption wavelength of which can be changed by an applied voltage, and
    the filter control device changes the applied voltage to the filter at a predetermined time to thereby split the first reflected beam and the second reflected beam.

6. The optical pickup apparatus according to claim 3, wherein
    the filter is arranged at a predetermined angle with respect to an optical path of the reflected beam.

7. The optical pickup apparatus according to claim 1, wherein
    the first light source and the second light source irradiate optical beams each having different wavelengths,
    the splitter device is a diffraction grating for splitting the reflected beam into the first reflected beam and the second reflected beam, and
    the light-receiving device has first light-receiving signal output device for receiving the first reflected beam to output a first light-receiving signal and second light-receiving signal output device for receiving the second reflected beam to output a second light-receiving signal.

8. The optical pickup apparatus according to claim 1, wherein
    the first optical beam and the second optical beam each have different polarizing directions,
    the splitter device is a polarizing beam splitter for transmitting any one of the first reflected beam and the second reflected beam and for reflecting the other reflected beam to split the first reflected beam and the second reflected beam, and
    the splitter device has (1-1)th light-receiving signal output device for receiving the first reflected beam to output a first light-receiving signal and (1-2)th light-receiving signal output device for receiving the second reflected beam to output a second light-receiving signal.

9. The optical pickup apparatus according to claim 8, wherein
    wavelength plates for giving circular polarization are arranged on irradiation optical paths of the optical beams irradiated respectively from the first light source and the second light source.

10. The optical pickup apparatus according to claim 1, wherein the light-receiving device is constituted by at least two regions divided by two with respect to the jitter directions.

11. The optical pickup apparatus according to claim 1, wherein the light-receiving device is divided into a shape obtained by coaxially overlapping a first circle and a second circle smaller than the first circle and is constituted by a first region except for a region overlapping the second circle in the region of the first circle and a second region given by the second circle.

12. The optical pickup apparatus according to claim 1, wherein the control device further has phase difference specifying device which specifies a phase difference between the first light-receiving signal and the second light-receiving signal output from the light-receiving device, and the control device further calculates a correction amount in the jitter directions depending on the specified phase difference, and controls the irradiation position changing device on the correction amount.

13. The optical pickup apparatus according to claim 12, wherein the phase difference specifying device specifies the phase difference on the basis of at least one of a land pre-pit signal and a wobble signal included in the first light-receiving signal and the second light-receiving signal output from the light-receiving device.

14. An information recording and reproduction apparatus including an optical pickup apparatus which has a first light source and a second light source which simultaneously irradiate a first optical beam and a second optical beam on an information recording medium and receives reflected beams of the first optical beam and the second optical beam from the information recording medium, the optical pickup apparatus comprises:

an objective lens for focusing the first optical beam and the second optical beam on the information recording medium;

an irradiation position changing device having a sub-lens and displacing the sub-lens in focus directions, tracking directions, and jitter directions of the second optical beam to displace a focus irradiation position of the second optical beam for changing the focus irradiation position of the second optical beam;

a splitter device for each splitting the reflected beams into a first reflected beam serving as the reflected beam of the first optical beam and a second reflected beam serving as the reflected beam of the second optical beam;

a light-receiving device for receiving the first reflected beam to output a first light-receiving signal and which receives the second reflected beam to output a second light-receiving signal; and a control device for controlling the irradiation position changing device on the basis of the second light-receiving signal to correct displacement of the focus irradiation position of the second optical beam with respect to the focus irradiation position of the first optical beam.

* * * * *